(12) United States Patent
Karimi Vajargah et al.

(10) Patent No.: US 11,466,554 B2
(45) Date of Patent: Oct. 11, 2022

(54) DATA-DRIVEN METHODS AND SYSTEMS FOR IMPROVING OIL AND GAS DRILLING AND COMPLETION PROCESSES

(71) Applicant: QRI GROUP, LLC, Houston, TX (US)

(72) Inventors: Ali Karimi Vajargah, Houston, TX (US); David Castineira, Cambridge, MA (US); Zheren Ma, Houston, TX (US); Cedric Gael Fraces Gasmi, Standford, CA (US); Hamed Darabi, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 140 days.

(21) Appl. No.: 16/359,604

(22) Filed: Mar. 20, 2019

(65) Prior Publication Data

US 2019/0292908 A1    Sep. 26, 2019

Related U.S. Application Data

(60) Provisional application No. 62/645,638, filed on Mar. 20, 2018.

(51) Int. Cl.
   *E21B 44/00* (2006.01)
   *E21B 49/00* (2006.01)
   (Continued)

(52) U.S. Cl.
   CPC ............. *E21B 44/00* (2013.01); *E21B 47/13* (2020.05); *E21B 49/003* (2013.01); *G06F 17/18* (2013.01); *G06F 40/20* (2020.01); *G06N 20/10* (2019.01)

(58) Field of Classification Search
   CPC .......... E21B 44/00; G06F 17/18; G06F 40/20; G06N 20/10
   See application file for complete search history.

(56) References Cited

U.S. PATENT DOCUMENTS

| | | |
|---|---|---|
| 3,035,440 A | 5/1962 | Reed |
| 5,984,010 A | 11/1999 | Elias et al. |
| 6,101,447 A | 8/2000 | Poe |

(Continued)

FOREIGN PATENT DOCUMENTS

| | | |
|---|---|---|
| CN | 1209860 | 3/1999 |
| CN | 1664575 | 9/2005 |

(Continued)

OTHER PUBLICATIONS

Hoffimann, Sequence Mining and Pattern Analysis in Drilling Reports with Deep Natural Language Processing, arXiv:1712.01476v1, (Year: Dec. 5, 2017).*

(Continued)

*Primary Examiner* — Michael J Dalbo
(74) *Attorney, Agent, or Firm* — Workman Nydegger

(57) ABSTRACT

Embodiments are directed to managing and improving a drilling and completions process at a hydrocarbon extraction site, and to optimizing resource allocation at a hydrocarbon extraction site/region. In one scenario, a computer system accesses data generated by hardware sensors implemented by drilling and completion equipment at a hydrocarbon extraction site. The computer system formats the sensor data into a form readable by a data mining algorithm, and mines the formatted sensor data to identify characteristics related to the drilling and completion process. The computer system also accesses and integrates historical data related to the drilling and completion equipment at the hydrocarbon extraction site. The computer system then computes drilling and completion performance indicators that identify inefficiencies based on the characteristics identified for the equipment and based on the accessed historical data. Then, a remediation step is performed to resolve the identified inefficiency.

20 Claims, 12 Drawing Sheets

(51) Int. Cl.
  *G06F 17/18*  (2006.01)
  *G06N 20/10*  (2019.01)
  *E21B 47/13*  (2012.01)
  *G06F 40/20*  (2020.01)

(56) References Cited

U.S. PATENT DOCUMENTS

| | | | |
|---|---|---|---|
| 6,401,547 B1 | 6/2002 | Hatfield | |
| 7,079,952 B2 | 7/2006 | Thomas et al. | |
| 7,289,942 B2 | 10/2007 | Yang et al. | |
| 7,445,041 B2 | 11/2008 | O'Brien | |
| 7,556,099 B2 | 7/2009 | Arthur et al. | |
| 7,798,219 B1 | 9/2010 | Harnoy | |
| 7,857,047 B2* | 12/2010 | Remmert | E21B 44/00 |
| | | | 166/250.01 |
| 7,890,264 B2 | 2/2011 | Elphic | |
| 7,953,327 B2 | 5/2011 | Pereira et al. | |
| 7,963,327 B1 | 6/2011 | Saleri et al. | |
| 8,145,427 B1 | 3/2012 | Saleri et al. | |
| 8,145,428 B1 | 3/2012 | Saleri et al. | |
| 8,195,401 B2 | 6/2012 | Ella et al. | |
| 8,209,202 B2 | 6/2012 | Narayanan et al. | |
| 8,396,826 B2 | 3/2013 | Mijares et al. | |
| 8,880,422 B1 | 11/2014 | Lehmann et al. | |
| 9,239,961 B1* | 1/2016 | Cole | G06K 9/00456 |
| 9,710,766 B2 | 7/2017 | Saleri et al. | |
| 9,767,421 B2 | 9/2017 | Saleri et al. | |
| 9,792,571 B1* | 10/2017 | Mandava | G06Q 10/06393 |
| 9,940,724 B2 | 4/2018 | Jia et al. | |
| 9,946,986 B1 | 4/2018 | Saleri et al. | |
| 10,329,881 B1 | 6/2019 | Saleri et al. | |
| 10,477,157 B1 | 11/2019 | Shahdi et al. | |
| 2001/0015133 A1 | 8/2001 | Sakai et al. | |
| 2001/0037983 A1 | 11/2001 | Takahashi et al. | |
| 2002/0013687 A1 | 1/2002 | Ortoleva | |
| 2002/0120429 A1 | 8/2002 | Ortoleva | |
| 2002/0165671 A1 | 11/2002 | Middya | |
| 2002/0167314 A1 | 11/2002 | Prammer | |
| 2003/0167238 A1* | 9/2003 | Zeif | G06Q 99/00 |
| | | | 705/400 |
| 2003/0225606 A1 | 12/2003 | Raghuraman et al. | |
| 2004/0015376 A1 | 1/2004 | Zhu et al. | |
| 2004/0153437 A1 | 8/2004 | Buchan | |
| 2004/0158406 A1 | 8/2004 | Harrison | |
| 2004/0220846 A1 | 11/2004 | Cullick | |
| 2005/0038603 A1 | 2/2005 | Thomas et al. | |
| 2005/0149307 A1 | 7/2005 | Gurpiner et al. | |
| 2005/0209912 A1 | 9/2005 | Venningen et al. | |
| 2006/0224369 A1 | 10/2006 | Yang et al. | |
| 2006/0289157 A1 | 12/2006 | Rao | |
| 2007/0016389 A1 | 1/2007 | Ozgen | |
| 2007/0028417 A1 | 2/2007 | Crichlow | |
| 2007/0118346 A1 | 5/2007 | Wen et al. | |
| 2007/0143025 A1 | 6/2007 | Valdez et al. | |
| 2007/0156377 A1 | 7/2007 | Gurpinar | |
| 2007/0017968 A1 | 8/2007 | Cullick et al. | |
| 2007/0179768 A1 | 8/2007 | Cullick et al. | |
| 2007/0183604 A1 | 8/2007 | Araki et al. | |
| 2007/0284107 A1 | 12/2007 | Crichlow | |
| 2008/0052097 A1 | 2/2008 | Bouzas et al. | |
| 2008/0065363 A1 | 3/2008 | Middya | |
| 2008/0091283 A1 | 4/2008 | Balci et al. | |
| 2008/0252898 A1 | 10/2008 | Pfaff | |
| 2008/0262898 A1 | 10/2008 | Tonchev et al. | |
| 2008/0288226 A1 | 11/2008 | Gurpinar et al. | |
| 2009/0005630 A1 | 1/2009 | Yokoyama et al. | |
| 2009/0037115 A1 | 2/2009 | Magill et al. | |
| 2009/0084545 A1 | 4/2009 | Banerjee et al. | |
| 2009/0133871 A1 | 5/2009 | Skinner et al. | |
| 2009/0313772 A1 | 12/2009 | Talley | |
| 2010/0042458 A1 | 2/2010 | Rashid et al. | |
| 2010/0057418 A1 | 3/2010 | Li et al. | |
| 2010/0082142 A1 | 4/2010 | Usadi et al. | |
| 2010/0204972 A1 | 8/2010 | Hsu et al. | |
| 2010/0300682 A1 | 12/2010 | Thakur et al. | |
| 2011/0014088 A1 | 1/2011 | Zubrin et al. | |
| 2011/0054869 A1 | 3/2011 | Li | |
| 2011/0067443 A1 | 3/2011 | Martinez et al. | |
| 2011/0130966 A1 | 6/2011 | Zhan et al. | |
| 2011/0168391 A1 | 7/2011 | Saleri et al. | |
| 2011/0246099 A1 | 10/2011 | Estrada et al. | |
| 2011/0290479 A1 | 12/2011 | Izgec | |
| 2011/0295656 A1 | 12/2011 | Venkatasubramanian | |
| 2012/0101759 A1 | 4/2012 | Rai et al. | |
| 2012/0232865 A1 | 9/2012 | Maucec et al. | |
| 2012/0292055 A1 | 11/2012 | Swist | |
| 2013/0043025 A1 | 2/2013 | Scott | |
| 2013/0048279 A1 | 2/2013 | Appel et al. | |
| 2013/0110474 A1 | 5/2013 | Saleri | |
| 2013/0110524 A1 | 5/2013 | Saleri et al. | |
| 2013/0110563 A1 | 5/2013 | Saleri | |
| 2013/0110571 A1 | 5/2013 | Saleri et al. | |
| 2013/0151159 A1 | 6/2013 | Pomerantz et al. | |
| 2013/0161502 A1 | 6/2013 | Pomerantz et al. | |
| 2013/0218538 A1 | 8/2013 | Fuecker et al. | |
| 2013/0271757 A1 | 10/2013 | Kang et al. | |
| 2013/0338987 A1 | 12/2013 | Cheng et al. | |
| 2014/0310071 A1 | 10/2014 | Conradson | |
| 2015/0032377 A1 | 1/2015 | McAuliffe et al. | |
| 2015/0040990 A1* | 2/2015 | Mathiesen | E21B 34/08 |
| | | | 137/12 |
| 2015/0094994 A1 | 4/2015 | Sequeira et al. | |
| 2015/0269438 A1 | 9/2015 | Samarasekera et al. | |
| 2015/0278407 A1* | 10/2015 | Vennelakanti | E21B 49/003 |
| | | | 703/7 |
| 2015/0337631 A1 | 11/2015 | Matringe et al. | |
| 2015/0346010 A1 | 12/2015 | Matringe et al. | |
| 2015/0371345 A1* | 12/2015 | Jeffers | E21B 43/00 |
| | | | 705/7.25 |
| 2016/0214715 A1 | 7/2016 | Meffert | |
| 2016/0369616 A1 | 12/2016 | Leblanc et al. | |
| 2017/0058656 A1* | 3/2017 | Benson | E21B 7/04 |
| 2017/0335665 A1 | 11/2017 | Saleri | |
| 2017/0364795 A1* | 12/2017 | Anderson | G06N 20/10 |
| 2018/0053055 A1 | 2/2018 | Finding et al. | |
| 2018/0053352 A1 | 2/2018 | Finding et al. | |
| 2018/0075605 A1 | 3/2018 | Jia et al. | |
| 2018/0171788 A1 | 6/2018 | Waid et al. | |
| 2018/0190017 A1 | 7/2018 | Mendez et al. | |
| 2018/0197297 A1 | 7/2018 | Jia et al. | |
| 2018/0202264 A1 | 7/2018 | Sarduy et al. | |
| 2018/0230782 A1 | 8/2018 | Pankaj et al. | |
| 2018/0298746 A1 | 10/2018 | Short et al. | |
| 2018/0315222 A1 | 11/2018 | Jones | |
| 2018/0315232 A1 | 11/2018 | Jones et al. | |
| 2018/0334902 A1 | 11/2018 | Olsen et al. | |
| 2019/0003918 A1 | 1/2019 | Li et al. | |
| 2019/0003919 A1 | 1/2019 | Asano et al. | |
| 2019/0003984 A1 | 1/2019 | Kester et al. | |
| 2019/0103005 A1 | 4/2019 | Gilberton et al. | |
| 2019/0188524 A1 | 6/2019 | He et al. | |
| 2019/0220002 A1 | 7/2019 | Huang et al. | |
| 2020/0293828 A1 | 9/2020 | Wang et al. | |
| 2020/0294257 A1 | 9/2020 | Yoo et al. | |
| 2020/0302125 A1* | 9/2020 | Bei | G06F 40/30 |
| 2020/0332627 A1* | 10/2020 | Tang | E21B 43/00 |

FOREIGN PATENT DOCUMENTS

| | | | |
|---|---|---|---|
| WO | WO-2017180157 A1 * | 10/2017 | E21B 7/043 |
| WO | 2018/132786 A1 | 7/2018 | |

OTHER PUBLICATIONS

IMRSV, Semantic Averaging of Documents Using WORD2VEC Representations, May 12, 2017, https://imrsv.ai/blog/2017/5/12/semantic-averaging-of-documents-using-word2vec-representations#:~:text=Introduction,are%20most%20likely%20to%20appear. (Year: 2017).*

Liu et al., "A Real-Time High Performance Computation Architecture for Multiple Moving Target Tracking Based on Wide-Area

(56) References Cited

OTHER PUBLICATIONS

Motion Imagery via Cloud and Graphic Processing Units", published Feb. 12, 2017 (Year: 2017).
Zhai et al., "Smart Autopilot Drone System for Surface Surveillance and Anomaly Detection via Customizable Deep Neural Network", 2020 (Year: 2020).
Non-Final Office Action received for U.S. Appl. No. 16/373,053, dated Oct. 14, 2020, 18 pages.
Notice of Allowance received for U.S. Appl. No. 15/914,712, dated Oct. 8, 2020.
Requirement for Restriction/Election received for U.S. Appl. No. 16/373,053, dated Aug. 7, 2020, 6 pages.
Abbaszadeh, M., Corbett, C., Broetz, R., Wang, J., Xue, F., Nitka, T., Zhang, Y., Liu, Z.Y. "Development of an Integrated Reservoir Model for a Naturally Fractured Volcanic Reservoir in China." SPE Reservoir Evaluation and Engineering, Oct. 2001, pp. 406-414. (Year: 2001).
C.S. Kabir, B. Izgec; "Diagnosis of Reservoir Compartmentalization from Measured Pressure/Rate Data during Primary Depletion"; Elsevier, 2009; Journal of Petroleum Science and Engineering, vol. 69; p. 271-282.
Committee on Advanced Drilling Technologies, National Research Council. "Drilling and Excavation Technologies for the Future." The National Academic Press, 1994. (Year: 1994).
Final Office Action received for U.S. Appl. No. 13/282,315, dated Jun. 25, 2015.
Final Office Action received for U.S. Appl. No. 12/606,027, dated Jan. 19, 2012.
Final Office Action received for U.S. Appl. No. 13/282,282, dated Dec. 26, 2014.
Final Office Action received for U.S. Appl. No. 13/282,297, dated Sep. 11, 2013.
Jerry Ham, "Ranking of Texas Reservoirs for Application of Carbon Dioxide Miscible Displacement", Apr. 1996.
Jonas Cordazzo, Colvis Raimundo Maliska, Antonio Fabio Carvalho da Silva; "Interblock Transmissibility Calculation Analysis for Petroleum Reservoir Simulation"; Federal University of Santa Catarina, Nov. 2002; p. 1-18.
Ivestorwords.com, "lagging indiciator", "leading indicator", http://www.investorwords.com/2713/lagging_indicator.html, http://www.investorwords.com/2741/leading indicator.html.
Office Action received for U.S. Appl. No. 13/282,282, dated May 11, 2015.
Office Action received for U.S. Appl. No. 12/915,278, dated Nov. 7, 2011.
Office Action received for U.S. Appl. No. 13/282,282, dated Mar. 27, 2014.
Office Action received for U.S. Appl. No. 13/282,297, dated Apr. 1, 2013.
Office Action received for U.S. Appl. No. 13/282,315, dated Aug. 18, 2014.
Office Action received for U.S. Appl. No. 13/282,315, dated Feb. 18, 2015.
Priscilla G. McLeroy; "Transient Pressure Analysis in Strip Reservoirs with Linear Skin Discontinuities"; Stanford University, 1986; p. i-58.
Sayarpour M, Zuluaga E, Kabir C S, et al. The use of capacitance-resistance models for rapid estimation of waterflood performance and optimization. Journal of Petroleum Science and Engineering, 2009, 69(3/4): 227-238.
Shunde Yin; "Geomechanics-Reservoir Modeling by Displacement Discontinuity-Finite Element Method"; University of Waterloo, 2008; p. i-141.
Slide from Presentation by Inventor Joe Ault (2003).
U.S. Appl. No. 13/282,272, filed Oct. 26, 2011, Office Action dated Nov. 7, 2014.
U.S. Appl. filed Jan. 17, 2016, Saleri et al., U.S. Appl. No. 15/408,397.
U.S. Appl. filed Jun. 9, 2017, Saleri et al., U.S. Appl. No. 15/618,399.
U.S. Appl. filed Oct. 21, 2016, Saleri et al., U.S. Appl. No. 15/299,298.
U.S. Appl. filed Oct. 21, 2016, Saleri et al., U.S. Appl. No. 15/299,828.
U.S. Appl. No. 13/282,282, filed Oct. 26, 2011, Notice of Allowance dated Mar. 16, 2017.
U.S. Appl. No. 13/282,315, filed Oct. 26, 2011, Final Office Action dated Sep. 14, 2016.
U.S. Application mailed on Mar. 20, 2019 by Vajargah, U.S. Appl. No. 16/359,604.
Zhang, Guohong. Estimating Uncertainties in Integrated Reservoir Studies. Dec. 2003. Texas A&M University, PhD dissertation. (Year: 2003).
U.S. Appl. No. 16/448,594, filed Jun. 21, 2019, Toronyi.
International Search Report cited in PCT/US2011/030940 dated Jan. 11, 2012.
U.S. Appl. No. 14/836,564, filed Aug. 26, 2015, Mondal et al.
U.S. Appl. No. 12/915,278, filed Oct. 29, 2010, Saleri.
U.S. Appl. No. 12/606,027, filed Oct. 26, 2009, Saleri.
U.S. Appl. No. 13/282,272, filed Oct. 26, 2011, Saleri.
U.S. Appl. No. 15/914,712, filed Mar. 7, 2018, Saleri.
U.S. Appl. No. 15/618,890, filed Jun. 9, 2017, Matringe.
U.S. Appl. No. 16/389,086, filed Apr. 19, 2019, Benhallam.
U.S. Appl. No. 16/373,053, filed Apr. 2, 2019, Zhai.
Batavia, "Front-End Loading for Life Cycle Success", Offshore Technology Conference Paper No. OTC-12980; Published Apr. 2001.
BDM-Oklahoma, Inc., "Feasability Study of Heavy Oil Recovery in the United States", U.S. Department of Energy, Document No. NIPER/BDM-0225; Published Mar. 1995.
Burns et al., "Gas Field Development: Automatic Selection of Locations for New Producing Wells", Society of Petroleum Engineers, Document No. SPE-2429; Published 1969.
Cordazzo et al., "Interblock Transmissibility Calculation Analysis for Petroleum Reservoir Simulation", Federal University of Santa Catarina, Nov. 2002, pp. 1-18.
Fiksel et al., "Measuring Progress Towards Sustainability Principles, Process, and Best Practices", 1999 Greening of Industry Network Conference Best Practice Proceedings.
Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.
Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.
Ham, Jerry, Ranking of Texas Reservoirs for Application of Carbon Dioxide Miscible Displacement, Apr. 1996.
Helman, "The Octopus", Forbes Energy & Genius, pp. 454-51, Nov. 24, 2008.
Investopedia.com, "What are leading, lagging, and coincident indicators? What are they for?", http://www.investopedia.com/ask/answers/177.asp, retrieved on Feb. 27, 2012.
Investorwords.com, "lagging indicator", "leading indicator", http://www.investorwords.com/2713/lagging_indicator.html, http://www.investorwords.com/2741/leading_indicator.html.
Izgec et al., "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
"The Report of The BP U.S. Refineries Independent Safety Review Panel", Jan. 2007.
Rivas et al., "Ranking Reservoirs for Carbon Dioxide Flooding Processes", 1994.

(56) References Cited

OTHER PUBLICATIONS

Saleri et al., "Data and Data Hierarchy", SPE 21369, pp. 1286-1293, Dec. 1992.
Saleri, "Dawn in the Desert: Saudi High Tech Paying Off at Ghawar", Energy Tribune, pp. 15-17, Sep. 2007.
Saleri et al., "Engineering Control in Reservoir Simulation: Parts I and II", SPE 18305, 1988.
Saleri et al., "The Expanding Role of the Drill Bit in Shaping the Subsurface", JPT, pp. 53-58, Dec. 2003.
Saleri, "Haradh III: A Milestone for Smart Fields", JPT, Nov. 2006.
Saleri, "'Learning' Reservoirs: Adapting to Disruptive Technologies", JPT, pp. 57-60, Mar. 2002.
Saleri, "The Next Trillion: Anticipating and Enabling Game-Changing Recoveries", JPT, Apr. 2006.
Saleri, "Reservoir Management Tenets: Why They Matter to Sustainable Supplies", JPT, pp. 28-30, Jan. 2005.
Saleri, "Reservoir Performance Forecasting: Acceleration by Parallel Planning", JPT, pp. 652-657, Jul. 1993.
Saleri et al., "Shaybah-220: A Maximum-Reservoir-Contact (MRC) Well and Its Implications for Developing Tight-Facies Reservoirs", SPE Reservoir Evaluation &.
Saleri, "Tenets and Diagnostics in Modern Reservoir Management", 8th International Forum on Reservoir Simulation, Jun. 2005, Stressa, Italy.
Sayarpour et al., "The use of capacitance-resistance models for rapid estimation of waterflood performance and optimization", Journal of Petroleum Science and Engineering, 69 (2009, 227-238).
Schlumberger.com retrieved from WayBack Machine, http://web.archive.org/web/20071230014516/http://www.slb.com/.
Slide from 2003 Presentation by Joe Ault.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Society of Petroleum Engineers, "Petroleum Resources Management System"; SPE/World Petroleum Council; Published Apr. 2007.
Society of Petroleum Engineers, "Guidelines for the Evaluation of Petroleum Reserves and Resources"; SPE in associate with World Petroleum Congresses and American Association of Petroleum Geologists, 2001; pp. 1-139.
Yin "Geomechanics-Reservoir Modeling by Displacement Discontinuity-Finite Element Method" University of Waterloo, 2008, p. 1-141.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/606,027, filed Oct. 26, 2009, Office Action dated Aug. 10, 2011.
U.S. Appl. No. 12/915,278, filed Oct. 29, 2010, Office Action dated Nov. 7, 2011.
U.S. Appl. No. 12/567,361, filed Sep. 25, 2009, Office Action dated Nov. 30, 2011.
U.S. Appl. No. 12/567,404, filed Sep. 29, 2009, Office Action dated Dec. 8, 2011.
U.S. Appl. No. 12/606,027, filed Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl. No. 13/282,297, filed Oct. 26, 2011, Final Office Action dated Sep. 11, 2013.
U.S. Appl. No. 13/282,297, filed Oct. 26, 2011, Advisory Action dated Nov. 18, 2013.
U.S. Appl. No. 13/282,272, filed Oct. 26, 2011, Office Action dated Mar. 27, 2014.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
U.S. Appl. No. 13/282,282, filed Oct. 26, 2011, Notice of References dated Nov. 30, 2015.
U.S. Appl. No. 13/282,272, filed Oct. 26, 2011, Final Office Action dated Dec. 9, 2015.
U.S. Appl. No. 13/282,297, filed Oct. 26, 2011, Final Office Action dated Dec. 30, 2015.
U.S. Appl. No. 13/282,315, filed Oct. 26, 2011, Office Action dated Mar. 9, 2016.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
U.S. Appl. No. 13/282,297, filed Oct. 26, 2011, Office Action dated Oct. 12, 2016.
U.S. Appl. No. 13/282,282, filed Oct. 26, 2011, Final Office Action dated Nov. 14, 2016.
U.S. Appl. No. 15/299,828, filed Oct. 21, 2016, Office Action dated Aug. 17, 2017.
U.S. Appl. No. 15/299,828, filed Oct. 21, 2016, Notice of Allowance dated Feb. 2, 2018.
U.S. Appl. No. 13/282,297, filed Oct. 26, 2011, Notice of Allowance dated May 31, 2017.
U.S. Appl. No. 14/604,367, filed Jan. 23, 2015, Office Action dated Jun. 16, 2017.
U.S. Appl. No. 14/604,330, filed Jan. 23, 2015, Office Action dated Jun. 30, 2017.
U.S. Appl. No. 14/604,367, filed Jan. 23, 2015, Final Office Action dated Sep. 21, 2017.
U.S. Appl. No. 15/618,399, filed Jun. 9, 2017, Office Action dated Apr. 29, 2019.
U.S. Appl. No. 15/618,399, filed Jun. 9, 2017, Notice of Allowance dated Aug. 26, 2019.
U.S. Appl. No. 14/836,564, filed Aug. 26, 2015, Office Action dated Aug. 9, 2018.
U.S. Appl. No. 14/836,564, filed Aug. 26, 2015, Final Office Action dated Feb. 15, 2019.
U.S. Appl. No. 14/836,564, filed Aug. 26, 2015, Notice of Allowance dated Nov. 20, 2019.
U.S. Appl. No. 15/618,890, filed Jun. 9, 2017, Office Action dated Mar. 4, 2019.
U.S. Appl. No. 15/618,890, filed Jun. 9, 2017, Notice of Allowanced dated Jun. 24, 2019.
Rohlfing, T. (Jul. 2001). Efficient voxel lookup in nonuniformly spaced images using virtual uniform axes. In Medical Imaging 2001: Image Processing (vol. 4322, pp. 986-994). SPIE. (Year: 2001).
Guidelines for the Evaluation of Petroleum Reserves and Resource, 2001 https://www.spe.org/industry/docs/Guidelines-Evaluation-Reserves-Resources-2001 .pdf (Year: 2001).
New Oil in Old Places; Robert M. Sneider and John S. Sneider; Search and Discovery Article #10007 (2000) (Year: 2000).
Gou et al., CN 108756848, "An Intelligent Drilling Control Cloud Platform and Intelligent Drilling Control System" (translation), May 21, 2019, 17 pgs <CN_108756848.pdf>.

\* cited by examiner

FIG. 2

| Bit Runs | Size | Make | Type | Serial No. | Nozzles No*size | Depth in | Depth out | Foot age | Hrs | Avrg Ft/hr | WOB *1000 | RPM min/max | Cum Revs | GPM | Press |
|---|---|---|---|---|---|---|---|---|---|---|---|---|---|---|---|
| 2RR | 12.25 | ULT ERA | U619 | 23066 | 9x13 | 1,800 | 06,906.0 | 205.0 | 3.00 | 68.3 | 5/10 | 55/60 | | 650 | 700 |

| Casing | | | | | | | | |
|---|---|---|---|---|---|---|---|---|
| | Conductor | | Surface | | Intermediate | | Liner | Completion |
| Liner | size | shoe | size | shoe | size | shoe | size | shoe | TOL | size | shoe | TOL | Completion Code |
| | | | | | | | | | | | | | HA237 |

Drilling Assembly: 3x6.5"HW+5.5"XO+3x7"DC+8.25"XO+8.25"DC+8.5"JAR+10x8.25"DC+8.25"ROR+8"ROR +12.25"FX+9.625"M+12.25"PDC

| String Wt. | 149 | Pull Up Wt. | 149 | Slack Off Wt. | 149 | Wt below jar | 3.00 |
|---|---|---|---|---|---|---|---|

| Time | Hrs | Phase | OP Type | Time Breakdown From Midnight |
|---|---|---|---|---|
| 00:00 | | | | Start time for these operations |
| 00:30 | 0.50 | DR12F | P | TIME OUT FOR SAFETY. (R-1) |
| 10:30 | 10.00 | DR12F | P | P/U & M/U 5 1/2" DP AND RACK BACK IN DERRICK (TOTAL 45 STANDS) |
| 11:00 | 0.50 | DR12F | P | CONDUCT H2S DRILL |
| 12:00 | 1.00 | DR12F | P | CONT P/U & M/U 5 1/2" DP AND RACK BACK IN DERRICK (TOTAL 48 STANDS) |
| 12:30 | 0.50 | DR12F | P | TIME OUT FOR SAFETY. (R-1) |
| 16:00 | 3.50 | DR12F | P | CONT P/U & M/U 5 1/2" DP AND RACK BACK IN DERRICK (TOTAL 59 STANDS) |
| 20:00 | 4.00 | DR12F | P | BREAK CIRC, TAG TOC AT 1701. DRILL OUT CMT, SHOE TRACK F/1701' TO F/S @ 1790'. DISPLACE HOLE W/65 PCF POLYMER MUD.DRILL OUT F/S AND RAT HOLE TO 1800'. RECIPROCATE STRING TO CLEAN RAT HOLE. |
| 20:30 | 0.50 | DR12F | P | CONDUCT KICK DRILL WHILE DRILLING. (RESPONSE TIME - 75 SEC) |
| 23:30 | 3.00 | DR12F | P | MTR DRILLING 12 1/4" HOLE F/1800' TO 2005'. (R-2) |
| 00:00 | 0.50 | DR12F | P | RIG SERVICE. |
| | | | | R-2: WASH & REAM AS REQUIRED. |

Next 24 Hrs Operations: DRILL OUT 12 1/4" HOLE

200

201

202

| PV. | 12 | SODIUM BICAR_8 | 1,000 |
|---|---|---|---|
| YP: | 22 | POTASSIUM CHLO | 14,000 |
| Gel(0/10) | 5/7 | XC-POLYMER_89- | 11,000 |
| W/L: | 14.0 | LIME_89-12-52-85 | 3,750 |
| pH: | 9.50 | HIGH QUAL LUB | 16 |
| Cl++: | 6500 | BARITE_89-22-28- | 112,500 |
| Ca++ | | ZINC CARBONATE | 900 |
| Cor Solid | | BENTONITE_89-22 | 7,000 |
| | | DEXTRID_89-22-2 | 17,500 |
| Daily Mud cost: | 0.00 | | |
| Cum Mud cost: | 23,914.00 | | |

Remarks
R-1: DISCUSS WITH BOTH CREW LPR 5, SPPR 5, WELL KILL DRILL.

Daily NPT/Cum. NPT: 0/0

| Available Transport & Heavy Equipment:DS CAR/1,TLC/2,FORK LIFT/1,MAN LIFT/1,CRANE/1 | | | | | | | |
|---|---|---|---|---|---|---|---|
| Crew Shortage_NIL | | | | | | | |
| ADCO Mud Supervisor | | SAID | | | | | |
| CAMS Engineer: NIL | | | | | | | |
| Personnel on Location | | | | Daily & Cum. Costs | | | 46,739 | 373,912 |
| SCOOMI | ADCO | AL-MASOI | NDC | DD | EMI TPT | SLB CMT | NC | Total Rig Crew |
| 2 | 2 | 4 | 54 | 1 | 1 | 1 | 2 | 67 |
| NDC Rig Manager | | DE BAO | | ADCO Day DS(06:00-18:00) | | | KAMTA PRASAD |
| | | | | ADCO Night DS(18:00-06:00) | | | |

DATA-DRIVEN METHODS AND SYSTEMS FOR IMPROVING OIL AND GAS DRILLING AND COMPLETION PROCESSES

CROSS-REFERENCE TO RELATED APPLICATIONS

This application claims priority to U.S. Provisional Patent Application No. 62/645,638, filed Mar. 20, 2018, which is incorporated herein by reference in its entirety.

BACKGROUND

Hydrocarbon extraction sites typically include drilling rigs, completion rigs, and other equipment for extracting oil and other materials from the ground. These rigs and associated equipment often experience non-productive time in which the rigs are inoperable or are operating at a suboptimal rate. This is often due to obstacles or inefficiencies that might be preventable. However, these obstacles and inefficiencies are difficult to quantify by the operators due to inefficiencies in processing large data sets and, if they are known, solutions are not readily available.

BRIEF SUMMARY

Embodiments described herein are directed to improving a drilling and completions process at a hydrocarbon extraction site/region and to optimizing resource allocation at a hydrocarbon extraction region. In one embodiment, a computer system accesses data generated by hardware sensors implemented by drilling and completion equipment at the hydrocarbon extraction site. The computer system formats the accessed sensor data into a form readable by a data mining algorithm, and mines the formatted sensor data to identify characteristics related to the drilling and completion equipment or process. The computer system also accesses and integrates historical data related to the drilling and completion equipment at the hydrocarbon extraction site. The computer system then computes drilling and completion performance indicators that identify inefficiencies based on the characteristics identified for the drilling and completion equipment/process and the integrated historical and sensor data and, upon identifying the at least one drilling and completion inefficiency, performs a remediation step to resolve the identified inefficiency.

In another embodiment, a computer system accesses a daily drilling and completion report that includes current operational description data for a hydrocarbon extraction task that implements a hydrocarbon extraction rig at the drilling and completions site. The computer system instantiates a natural language processing unit configured to analyze and mine the accessed drilling and completion report for specific portions of operation data (or hydrocarbon extraction task data), and instantiates a machine learning unit configured to analyze the current and historical rig operation data to identify the drilling and completion phase (or subtask) and non-productive time periods during which the hydrocarbon extraction task is halted or is producing below a specified minimum productivity level. The computer system accesses historical rig operation data and production forecast (or effect of injection wells on production forecast of nearby wells) for future wells (to be drilled) and generates an optimized rig scheduling sequence for the rig that optimizes an objective function by allocating resources to the hydrocarbon extraction task that results in maximum gain during times when productivity is projected to be sufficiently high. The rig is then operated according to the optimized rig scheduling sequence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 2 illustrates an embodiment of a part of a daily drilling report.

DETAILED DESCRIPTION

Figure 1:
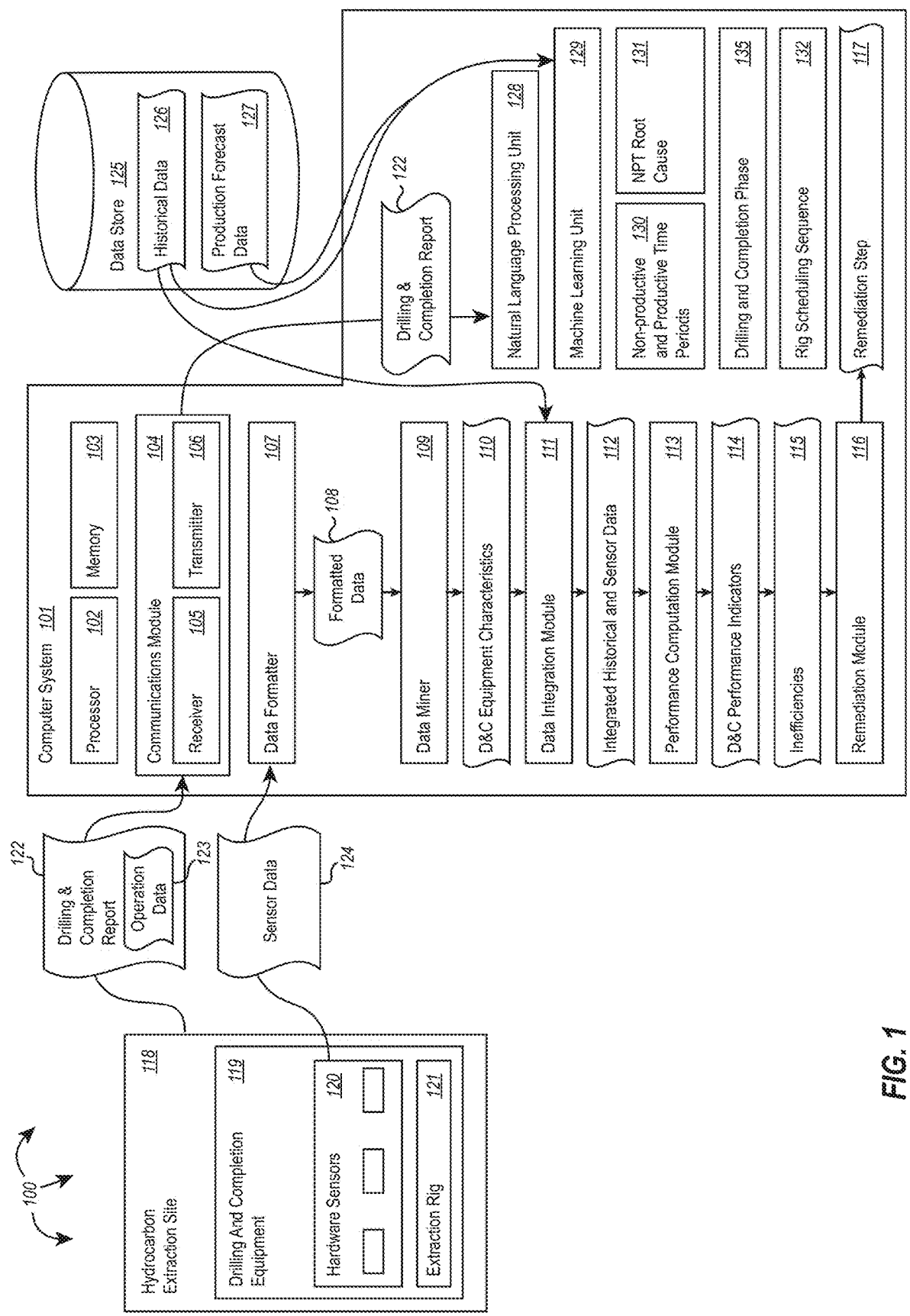
FIG. 1 illustrates a computer architecture in which embodiments described herein may operate including improving a drilling and completions process at a hydrocarbon extraction site and optimizing resource allocation at a hydrocarbon extraction site.

Embodiments described herein are directed to managing a drilling and completions process at a hydrocarbon extraction site and to optimizing resource allocation at a hydrocarbon extraction site. In one embodiment, a computer system accesses data generated by hardware sensors implemented by drilling and completion equipment at the hydrocarbon extraction site. The computer system formats the accessed sensor data to into a form readable by a data mining algorithm, and mines the formatted sensor data to identify characteristics related to the drilling and completion equipment. The computer system also accesses and integrates historical data related to the drilling and completion equipment at the hydrocarbon extraction site. The computer system then computes drilling and completion performance indicators that identify inefficiencies based on the characteristics identified for the drilling and completion equipment and the integrated historical and sensor data and, upon identifying the at least one drilling and completion inefficiency, performs a remediation step to resolve the identified inefficiency.

In another embodiment, a computer system accesses a rig report that includes current rig operation data for a hydrocarbon extraction task that implements a hydrocarbon extraction rig at the drilling and completions site. The computer system instantiates a natural language processing unit configured to analyze the accessed drilling and completion report for specific portions of (daily) operation data, accesses historical rig operation data related to the rig, and instantiates a machine learning unit configured to analyze the current and historical operational data to identify drilling and completion phase and non-productive time periods during which the hydrocarbon extraction task is halted or is producing below a minimum productivity level. The computer system also generates an optimized rig scheduling sequence for the rig that optimizes the objective function (e.g. NPV) by allocating resources to the hydrocarbon extraction task The rig is then moved according to the optimized rig scheduling sequence.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Turning now to FIG. 1, a computing architecture 100 is provided which at least one embodiment described herein may be employed. The computing architecture 100 includes a computer system 101. The computer system 101 includes at least one processor 102 and at least some system memory 103. The computer system 101 may be any type of local or distributed computer system, including a cloud computer system. The computer system 101 includes modules for performing a variety of different functions. For instance, the computer system 101 includes a communications module 104 with a receiver 105, a transmitter 106, or possibly a combined unit (i.e. a transceiver). The receiver and/or the transmitter may comprise hardware radios such as WiFi, Bluetooth, cellular, global positioning system (GPS) or other types of radios.

The communications module 104 may be configured to communicate with other computer systems using different wired or wireless communication links. Indeed, the communications module 104 may include any wired or wireless communication means that can receive and/or transmit data to or from other computer systems. The communications module 104 may be configured to interact with databases, mobile computing devices (such as mobile phones or tablets), embedded or other types of computer systems.

The computer system 101 may also include modules, functions, kernels, or special-purpose processors designed to manage a drilling and completions process at a hydrocarbon extraction site. For instance, computer system 101 includes a data formatter 107 designed to receive and format sensor data 124. The sensor data 124 may be received from hardware sensors 120 which are used on various pieces of drilling and completion equipment 119 at a hydrocarbon extraction site 118. The hardware sensors 120 may be any type of hardware sensor including temperature sensors, vibration sensors, gas sensors, light sensors, audio sensors, movement sensors, depth or position sensors, velocity sensors or other types of sensors. Each of these hardware sensors 120 may generate sensor data 124 which is received at the communications module 104 and provided to the data formatter 107. The data formatter 107 interprets and formats the sensor data 124 from any or all of the sensors 120, and provides the formatted data 108 to the data miner 109. The formatted data 108 is in a form that is understandable and usable by the data miner 109.

The data miner 109 may be configured to mine the formatted sensor data 108 for drilling and completion (D&C) equipment characteristics 110. These equipment characteristics may provide insights regarding the operation of the D&C equipment 119. For instance, the D&C equipment characteristics 110 may indicate that an extraction rig 121 is operating slowly or inefficiently. The data integration module 111 may gather information including the formatted sensor data 108 and other historical production data 126 related to the D&C equipment 119 and integrate or combine the data 112. This integrated historical and sensor data 112 may be used by the performance computation module 113, along with the identified D&C equipment characteristics 110 to identify D&C performance indicators 114 and inefficiencies in the operation of the D&C equipment 119. The remediation module 116 may use the identified D&C performance indicators 114 and inefficiencies 115 to make recommendations on which remediation steps 117 may be taken at the hydrocarbon extraction site 118 to reduce or eliminate the inefficiencies 114, and increase operational performance at the site. These and other concepts will be described further below with regard to FIGS. 2-13, and with regard to method FIGS. 14 and 15.

The methods and systems described herein are generally designed to perform one or more of the following: conduct automated quality control (QC) and information mining for large data sets associated with daily drilling and completions reports, aggregate data sets from different sources, predict the productive and non-productive time at the hydrocarbon extraction site 118 and its type, predict the drilling phase (drilling ahead, pulling out of the hole, casing and cement, installing a blow-out preventer (BOP), logging etc.), identify drilling bottlenecks, conduct detailed analysis by using metrics which tie D&C to production, geology, and reservoir management, assign a global drilling and completion score to a well which considers parameters such as wellbore placement, days to drill and complete, hydrocarbon production rate, cost, rate of penetration, etc., and apply this data-driven approach and historical data associated with this method for more accurate production forecast for future planning and resource allocation.

Embodiments described herein use natural language processing, text or information mining, and machine learning algorithms for QC and for extracting information from large sets of drilling and completion daily reports. This significantly reduces data processing time and aggregation time, and thus uses less computing resources including CPU cycles, memory, data storage and network bandwidth. In addition, future planning and resource allocation may be conducted by using the historical data 126 obtained from previous D&C equipment operation which makes the planning more robust and reliable. The embodiments herein may also be used for simultaneous daily monitoring of multiple wells or fields, using the historical data for event prediction during drilling, and automated solution proposal for problems encountered during drilling.

The embodiments described herein also improve drilling performance from a global reservoir management perspective, which focuses on improving capital efficiency, increasing production, and/or increasing reserve. Currently available tools lack advanced analytics, experience-based intelligent metrics, and the reservoir management focus required to successfully improve drilling and completion (D&C) performance.

In at least one embodiment, the first step performed by the computer system 101 is to quickly and effectively process large amounts of D&C data (e.g. a daily drilling and completion report 122 with operation data 123 and/or sensor data 124) to extract detailed analytics from the data to identify D&C bottlenecks. A global scoring system is provided herein to identify the problems associated with each well, as well as proposed solutions. Eventually, these analyses are used to optimize future planning and resource allocation at the hydrocarbon extraction site/region 118, and to maximize production/or NPV and improve capital efficiency.

During D&C operations, large volumes of data are collected which contain valuable information. Depending on the nature of the data, it can be used for rig monitoring, event-detection, identifying D&C bottlenecks, improving performance, look-back studies, future planning, etc. However, the data sets tend to be so large that they are difficult to manage. They are poorly structured and lack any integration with other data sources that are crucial for reservoir management such as production or geology. For instance, the important activities and parameters during D&C operations may be included in the Daily Drilling Report (DDR) (i.e. rig report 122).

The DDR is a consistent data source provided during D&C operations. The DDR is typically available even when real-time data for the well is not available. These drilling reports are collected daily and are usually stored in a database (e.g. data store 125). In most cases, the reports are only used for daily evaluation of the drilling performance, and are not integrated with other data sources. In addition, many mistakes might occur during the drafting of these reports, which makes Quality Control (QC) tasks and meaningful and reliable analysis very cumbersome and potentially impossible. During high D&C activity periods, a large quantity of data will be provided every day in the DDR.

FIG. 2 shows an example of a DDR 200 in English, although other languages (such as Spanish) may be used. Two sections highlighted in darker lines (201 and 202) include pertinent information such as depth, hole size and hourly description of the drilling operation.

One objective during D&C operations is to minimize non-productive time (NPT) and the associated cost. As a rule, non-productive time is any time that the rig (or other piece of D&C equipment) is functioning below a specified level. In most daily drilling reports, non-productive periods and associated causes are reported. However, these classifications are subjected to human perception and therefore, quite often biased or misreported. This can make the identification of drilling obstacles very difficult and inaccurate, which can lead to a poor future planning and performance evaluation. In the embodiments herein, a combination of Natural Language Processing (NLP), data/information mining and machine learning algorithms are used to quality check large volumes of drilling data (including text in the daily drilling reports), extract necessary information, and identify the non-productive time, the type of non-productive time, and the drilling phase.

During performance evaluations, several metrics are used such as days to drill, days per 10 k feet, cost/ft., etc. However, such metrics are not tied to other functionally important reservoir management parameters, and therefore are not representative of how drilling process affects reservoir management parameters. The embodiments herein provide a global drilling and completion score for each well (or other piece of D&C equipment). This score combines a variety of crucial metrics in each discipline, and significantly simplifies the identification of well problems.

When the results are generated, the visualization of the results with intelligent insights becomes important to quickly identify the drilling and bottlenecks in each field. For this purpose, a visualization tool that can automatically generate the required metrics/graphs for the analysis is provided. The fully automated reports assist the subject matter experts to focus only on the most important parameters. As the outcome of the analytics sections, wells can be ranked based on several parameters such as initial production, days to drill, normalized days to drill (e.g., days per 10 k ft), cost/ft, cost/bbl, Drilling Efficiency Index (DEI), Completion Efficiency Index (CEI), NPT, etc. As such, it is often difficult to compare overall efficiency of different wells. Herein, a unifying system is provided to assign each well a global drilling and completion score (e.g., 1-100), which can significantly simplify the comparison of overall well performance. Then, the score can be used to single out the problematics areas (which obtained a low score) and focus on improving those areas.

To maximize the gain, it is desirable to drill the best (i.e. the most productive) wells first. However, the days to drill measurement for each well is not necessarily identical, and depends on several parameters such as well design, depth, complexity of the reservoir, logistics, etc. In addition, each rig has its own historical performance and limitations, which makes the problem even more complicated. Therefore, an optimizer function is described herein to schedule the wells in an efficient manner to maximize the objective function (e.g., production or NPV). In at least some embodiments, this optimizer considers the historical performance of the rigs as well to minimize the usage of low performing resources. The objective functions implemented in the proposed methods are—cumulative production, Net Present Value (NPV), and operation time. After this stage and depending on the proposed field development plan, several scenarios can be investigated for future development.

Figure 3:
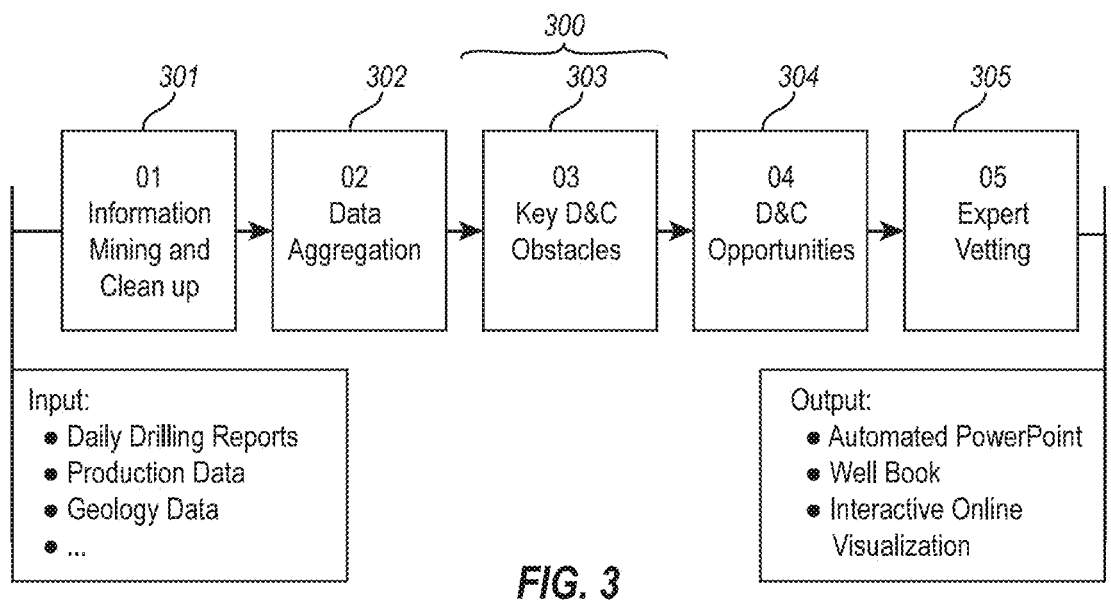
FIG. 3 illustrates a workflow for improving a drilling and completions process.

FIG. 3 shows a simplified workflow 300 for data-driven drilling solutions that optimize well production. The input data comes from various sources such as daily drilling reports (e.g. 122), production data, geology data (formation tops and properties), survey data, reservoir fluid properties, cost data, bit and mud information, pore pressure and fracture gradient, etc. The first step (301) of the workflow 300 is data clean up and information mining. In this step, automatic quality checking of the daily drilling reports is performed. Advanced text mining and natural language processing (NLP) techniques are used to extract hole size, depth and casing size from the text (hourly operation or wellbore diagrams). Obtained hole size and casing sizes are cross-checked with the wellbore diagram to assure validity of the results.

After QC and cleaning up of the DDR, in part 302 of workflow, several other data sources (e.g. historical data 126) will be integrated to the DDR which can significantly assist with identifying the key D&C obstacles (e.g. inefficiencies 115) in step 303. For instance, when geology, production, survey data, fracture and pore pressure, and mud and bit data sets are integrated to the DDR, it enables the system to find the most problematic formations during drilling, optimize the required mud properties for wellbore stability and cleaning, find the best performance bit for each formation and hole size, etc. One other possibility is to correlate the daily production data with drilling and completion performance by using the drilling efficiency index (DEI) and completion efficiency index (CEI).

In step 303, an interactive visualization tool associated with the comprehensive and automatically generated presentations and metrics may be used to identify key D&C obstacles. For instance, each well may be given a comprehensive performance score from 1-100 according to placement, drilling, completion, production, and capital efficiency. By applying this method, it is possible to single out the wells that had poor performance in a particular practice (e.g., drilling) for a more detailed analysis.

In addition to the unique metrics used in this method, detailed analysis of non-productive time (NPT) can also assist in identifying D&C bottlenecks. NPT is analyzed for each field, well, formation, hole size, company, team, well design, well type, and/or drilling phase, etc. Subsequently, in step 304, solutions (e.g. remediation steps 117) will be provided to mitigate NPT and improve drilling performance and capital efficiency according to the results obtained from step 303. In addition, the obtained results in step 303 may also be used for resource allocation optimization and scheduling of future wells. Eventually, the obtained results and analysis may be subjected to vetting by subject matter experts as illustrated in step 305 to assure the validity of the results and alignment of the proposed solutions with the best D&C practices and global reservoir management techniques. An optimizer may also be used to apply an optimization algorithm that controls how rigs are scheduled and further controls resource allocation to those rigs.

Figure 4:
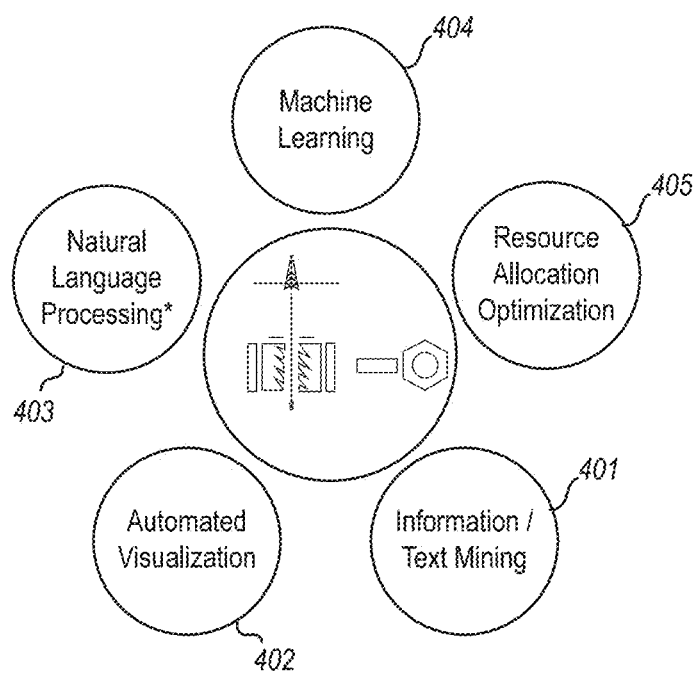
FIG. 4 illustrates a grouping of technologies implemented when improving the drilling and completions process.

With reference to an example in FIG. 4, several advanced technologies are used to facilitate the delivery of D&C solutions for large data sets. Applying these technologies can significantly reduce the analysis time from months to days, particularly for large data sets. As illustrated in FIG. 4, the technologies applied in the proposed method include information/text mining 401, automated visualization 402, natural language processing 403, machine learning 404 and resource allocation optimization 405 (with rig scheduling). The application of these technologies for the presented method is described in detail below.

In the embodiments herein, machine learning algorithms are used to unbiasedly classify the productive and non-productive time and find out the reasons for the occurrence of NPT. A small portion of the data, which is quality-checked by an expert, may be used to train the model. Then, the trained algorithm is used to classify the activities (productive (P) or non-productive (NP)), and also report the associated causes. In this method, since only a portion of data is used for training, the processing speed may be significantly higher than the full QC process by an expert, and has been shown to experience similar accuracy. As described in greater detail below, machine learning may also be used to perform phase drilling and completion detection that indicates which production phase a rig is currently in.

Text mining can convert unstructured information within the DDR to structured information that can be used later on to provide detailed analytics. This can be beneficial in analyzing the text description in the DDR and obtaining the necessary information from the text. For instance, hole size, depth and casing size can be extracted from the text to conduct QC instead of the time-consuming process of reading thousands of reports. Keyword identification is implemented to extract the critical information for the text.

For instance, consider the following activity in Table 1:

TABLE 1

| From | To | Description |
| --- | --- | --- |
| Aug. 19, 2016 18:30 | Aug. 19, 2016 23:30 | DRLG 16" VERTICAL HOLE F/ 4734' TO 4774' |

The table states that on Aug. 19, 2016 from 18:30 to 23:30, a 16" vertical hole was drilled from 4,734 ft to 4,774 ft. The keyword in this case is "DRLG", which is a common field abbreviation for "drilling", and also "HOLE", which indicates the wellbore size. "F/" (which means "from") and "TO" are also considered as keywords to extract the depth. During the drilling process, and as a common practice, hole size and drilling depth are stated in the hourly operation description. Therefore, when these keywords occur simultaneously, it is anticipated that the value for hole size and depth also will be mentioned as shown in the next example: DRILLED 22" HOLE SECTION F/125' TO 193' W/FULL RETURNS. It should be noted that while keywords may vary depending on the company, crew, practices, regions, etc., the concept remains valid.

In addition to keywords, some heuristic drilling rules may also be applied. For instance, when certain keywords are not found, the current hole size and depth may remain unchanged even though some numbers related to size or depth were reported. For example, "CONT. POOH F/860 FT TO SURF" states that the drill string was pulled out of the hole from 860 ft. to the surface. Since the keyword "drilling" is not found in this sentence, the reported numbers will not be considered as the current well depth. Note that sometimes additional information is also presented in the text makes the data mining more difficult. For instance, the following statements presents some additional numbers related to weight on bit, flow rate, torque, etc., which may be disregarded for hole size and depth extraction. In this scenario, position of the keyword with respect to the desired information may be significant.

Consider the following sentence: "CONT DRILL 12¼" DIR HOLE F/6426'TO 6435'—WOB: 25-35 KIPS, SRPM: 100, TRQ: 5-9 FLB, GPM-870, SPP-3100 PSI, Diff SPP: 150-200 PSI," which in addition to hole size and depth contains more information such as weight on bit, pipe rotation speed, toque, flow rate, etc. However, the words' position in the sentence are far (according to some defined threshold) from the keywords previously identified (drilling, hole, F/, To, etc.), and hence are disregarded for hole size and depth extraction. Thus, by combining the keywords with writing pattern recognition and heuristic rules in drilling, it is possible to present a comprehensive and robust algorithm for extraction of pertinent information (such as hole size and depth) from the DDR. One advantage of this method is that it can be applied to any language as long as the main keywords are present.

For instance, the following description is in Spanish: "CON BNA PDC DE 9½" PERFORA ROTANDO Y DESLIZANDO DESDE 412 M, HASTA 596 M," states that drilling is conducted with a 9.5" bit (hole size) from 412 m to 596 m. Note that keywords such as drilling ("PERFORA"), bit ("BNA"), from ("DESDE"), to ("HASTA") are still found in the text. Therefore, the algorithm described herein can be extended to this language as well.

Each activity in the daily drilling or completion report is typically classified as productive or non-productive. For instance, consider the following statement:

"DRLG 12¼" HOLE F/5960' T/5974'. Q: 700 GPM/1950 PSI, RPM: 50, WOB: 20 KLBS, 3 KLB-FT→Productive or (P), phase: drilling ahead."

Since the drilling was being performed as planned, the activity is classified as productive. Next, consider another statement: "REPAIR MP #1: CYL #3'S PISTON→Non-Productive or (NP), reason: rig maintenance, phase: wellbore conditioning." This statement indicates the mud pump is being repaired which is not planned and hence, is classified as down-time or non-productive time. Such classifications, however, are subjective and may vary depending on the interpretation of the individual in charge.

Figure 5:
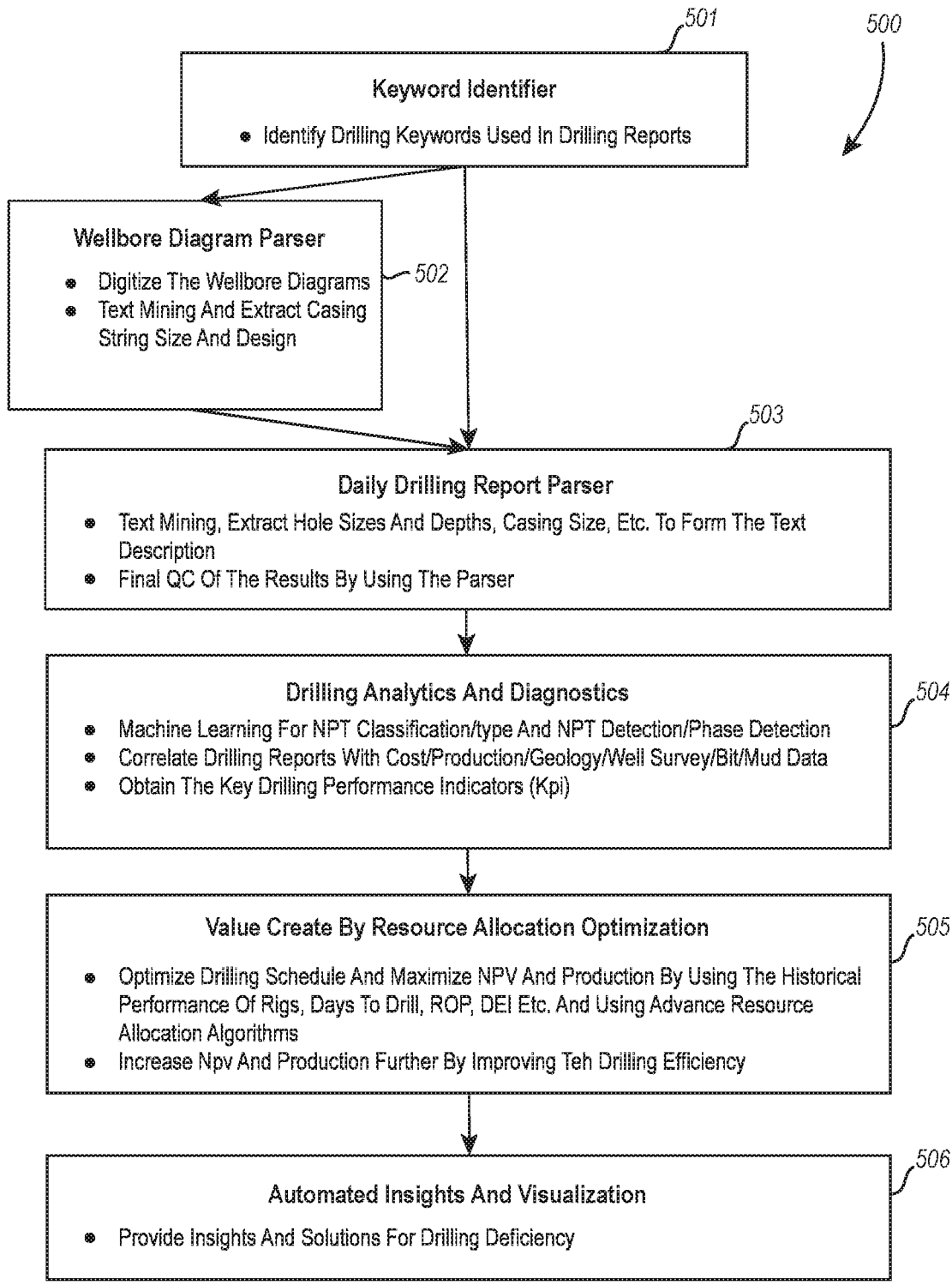
FIG. 5 illustrates a data processing workflow for improving the drilling and completions process including resource allocation optimization

With reference to an example in FIG. 5, additionally, in some cases, the classifications are not reported correctly to mask the non-productive time. Manually quality checking several thousand pages of drilling reports to properly classify NPT is unfeasible. In the embodiments herein, a machine learning algorithm may be trained based on portion of the data and applied to the rest of data set to provide an unbiased classification of (P) and (NP). This can assist in accurately identifying NPT and associated causes which can be used to mitigate the D&C bottlenecks. FIG. 5 illustrates a data processing workflow 500 for the presented method. Steps 501, 503 and 504 may implement NLP and ML to first identify the keywords in the drilling reports. Then, this information is used to extract other valuable information from the text such as hole size, depth, casing size etc. (502), classify the events in terms of Productive (P) and Non-Productive (NP) (504), find the root causes for non-productive time and predict the drilling phase for each activity (drilling ahead, pooling out of hole, casing and cement, BOP installation, logging, etc.) (505), and provide solutions for enhanced drilling efficiency (506).

In some embodiments, a specified model may be used to identify the drilling keywords used in a given report (e.g. a Word2vec model). The Word2vec model is a shallow two-layer neural network for producing word embeddings. The punctuations, accent marks and numbers are removed from the activity descriptions of the daily drilling reports. Then, the cleaned activity descriptions are used as input to train the model. As a result, the model produces a vector space that can represent each word used in daily drilling reports. Subsequently, the trained model is applied to identify most similar words (e.g., with higher cosine similarity) to the basic corpus of drilling keywords. The identified drilling keywords can be considered as an extension of predefined basic corpus customized for the studied region/field. A quick quality check can be done by the drilling experts to remove unrelated keywords found by the algorithm.

Figure 6A:
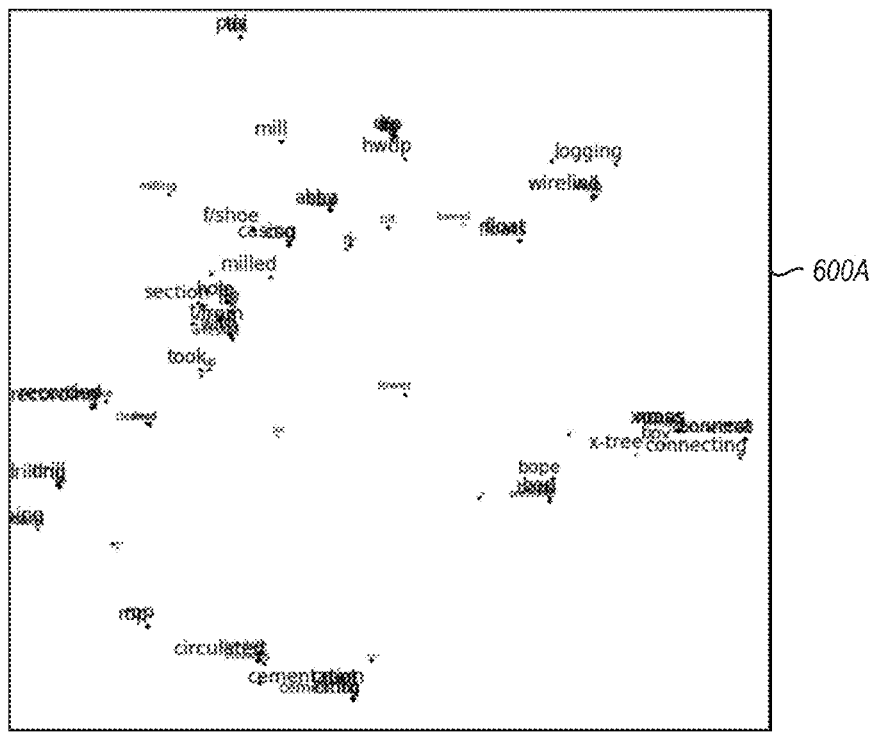
FIGS. 6A and 6B illustrate drilling and completion keyword similarity plots in English and Spanish.
Figure 6B:
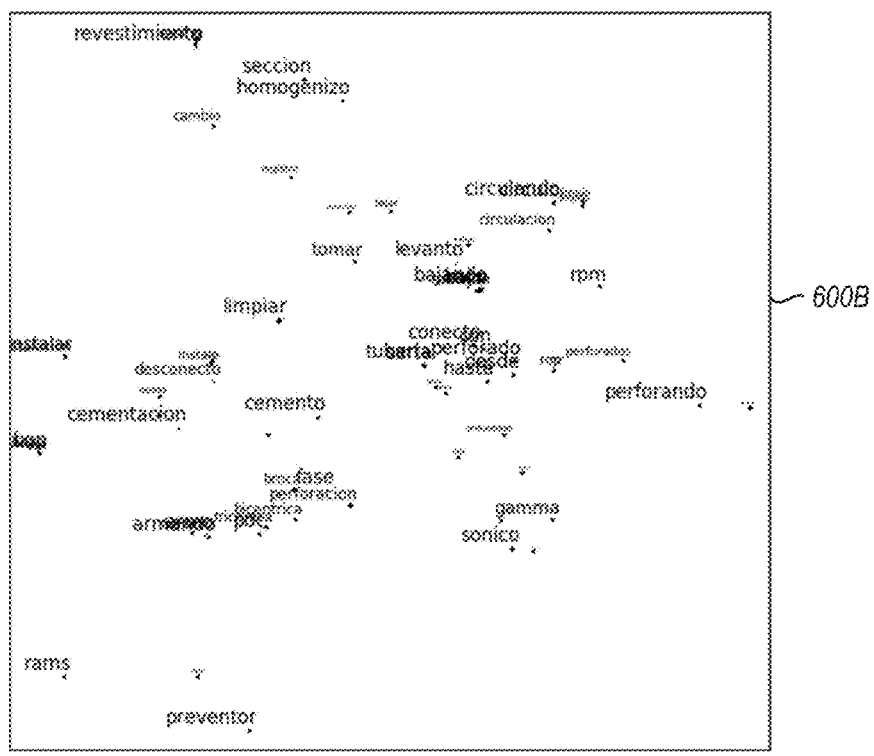

FIGS. 6A and 6B show the T-Distributed Stochastic Neighbor Embedding (tSNE) for drilling keywords in English and Spanish language respectively. In the tSNE plot 600A, similar words are close to each other. Font size is an indication of word frequency. For the English region (FIG. 6A), the ten most similar words of 'casing' are identified as 'csg', 'casings', 'w/csg', 'csgs', 'liner', 'tubing', 'tubings', 'from/', 'trk', 'csg-'. For the Spanish region (FIG. 6B), 'revestimiento', 'csg', 'ib-r', 'liner', 'tubing', 'linner', 'revestiento', 'hydro', 'hot', 'setting' are identified. A further (manual) quality check can eliminate some unrelated words such as 'from/', 'hot', etc.

Text and image information may be digitized from different formats of wellbore diagram files into the same data structure containing blocks of data. The properties of each block include its data type (text/table/image), normalized position on page and content. The OCR tools with clustering algorithms are applied to extract text from images considering their positions, and may further be applied to combine small blocks of databases on their positions and data types.

After digitizing the wellbore diagrams (502), text mining techniques are utilized to identify casing related numbers (503). Regular expressions may be utilized to find numbers around the identified casing keywords and units. For instance, a number can be a casing diameter when it is close to the casing keyword such as 'casing', 'revestimiento', 'csg' or 'revestiento' in the Spanish text version 600B of FIG. 6B. The number here is an API casing size. Also, it may be followed by a unit such as 'inch', 'in' or '"'. Similarly, the casing depth may be followed by 'ft', 'meter' or 'foot' or a similar unit for length. As such, candidates of casing diameters and depths can be identified. Subsequently, industry casing design guidelines may be used to filter out irrelevant numbers. For instance, the 13.375" casing is very likely to be followed by a 9.625/9.875/10.75" casing. A connected graph (casing and hole size selection tree) of the possible casing designs is constructed and used to identify valid casing designs.

Figure 7:
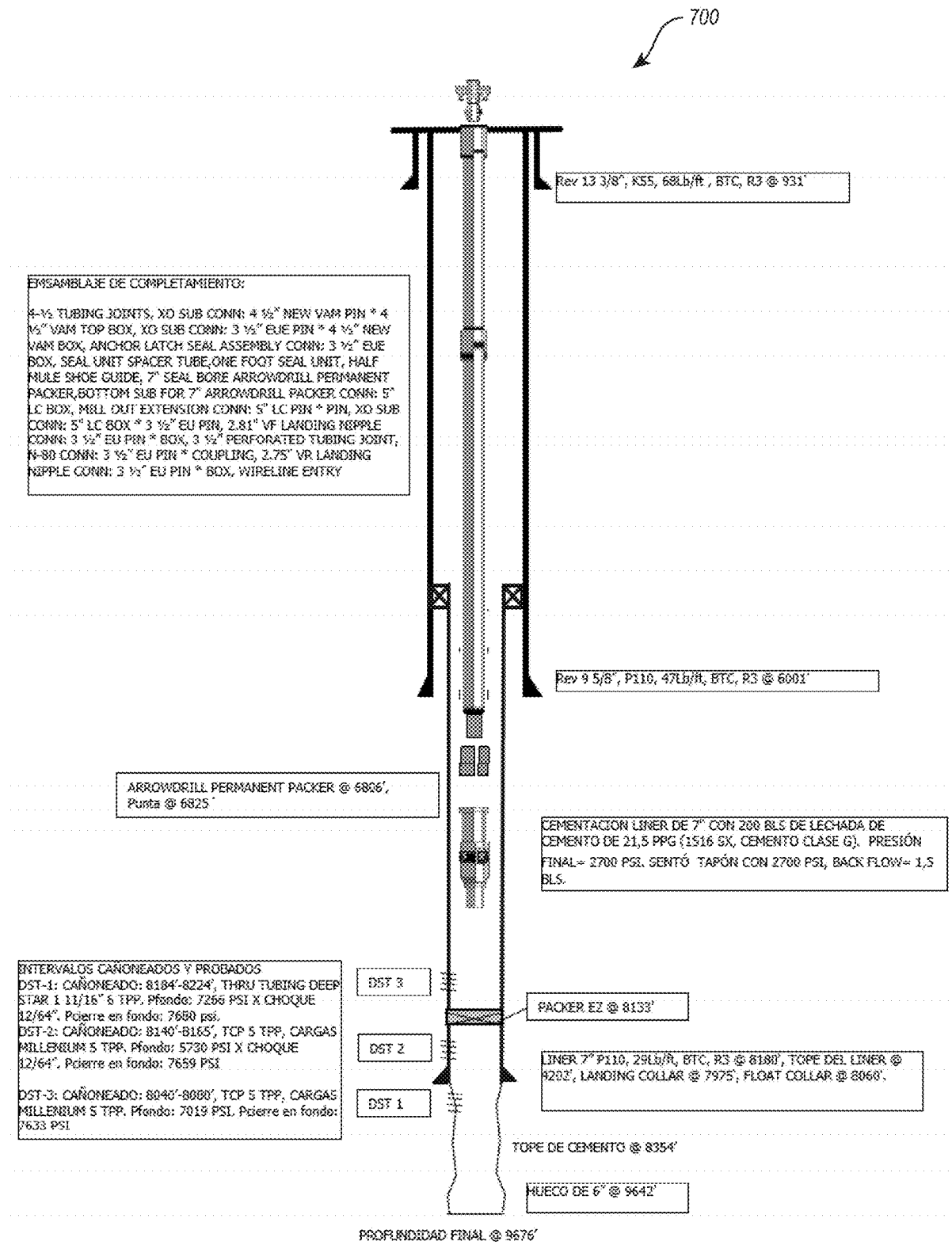
FIG. 7 illustrates an embodiment of a wellbore diagram.
Figure 8:
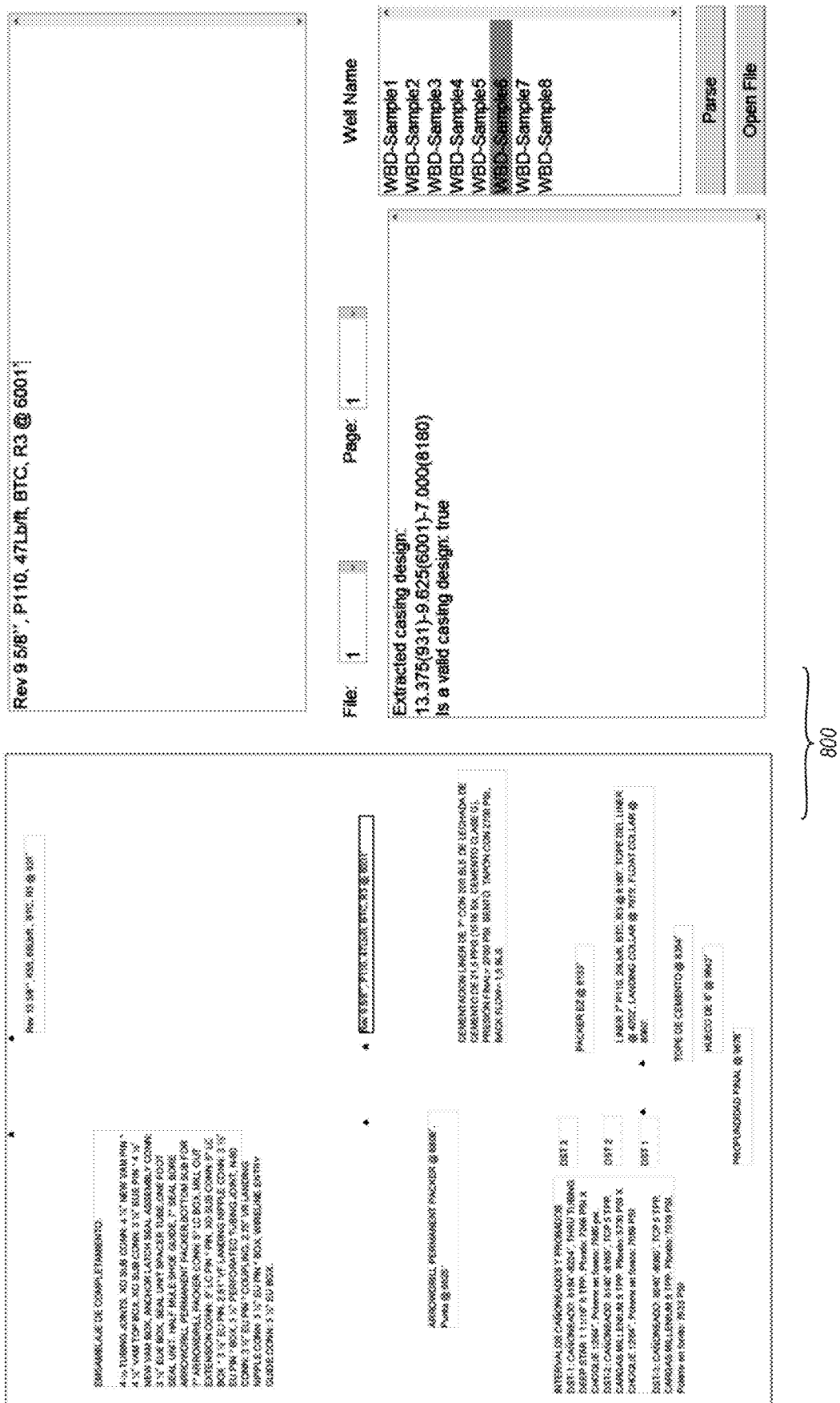
FIG. 8 illustrates an embodiment of the parsed result of the wellbore diagram.
Figure 9:
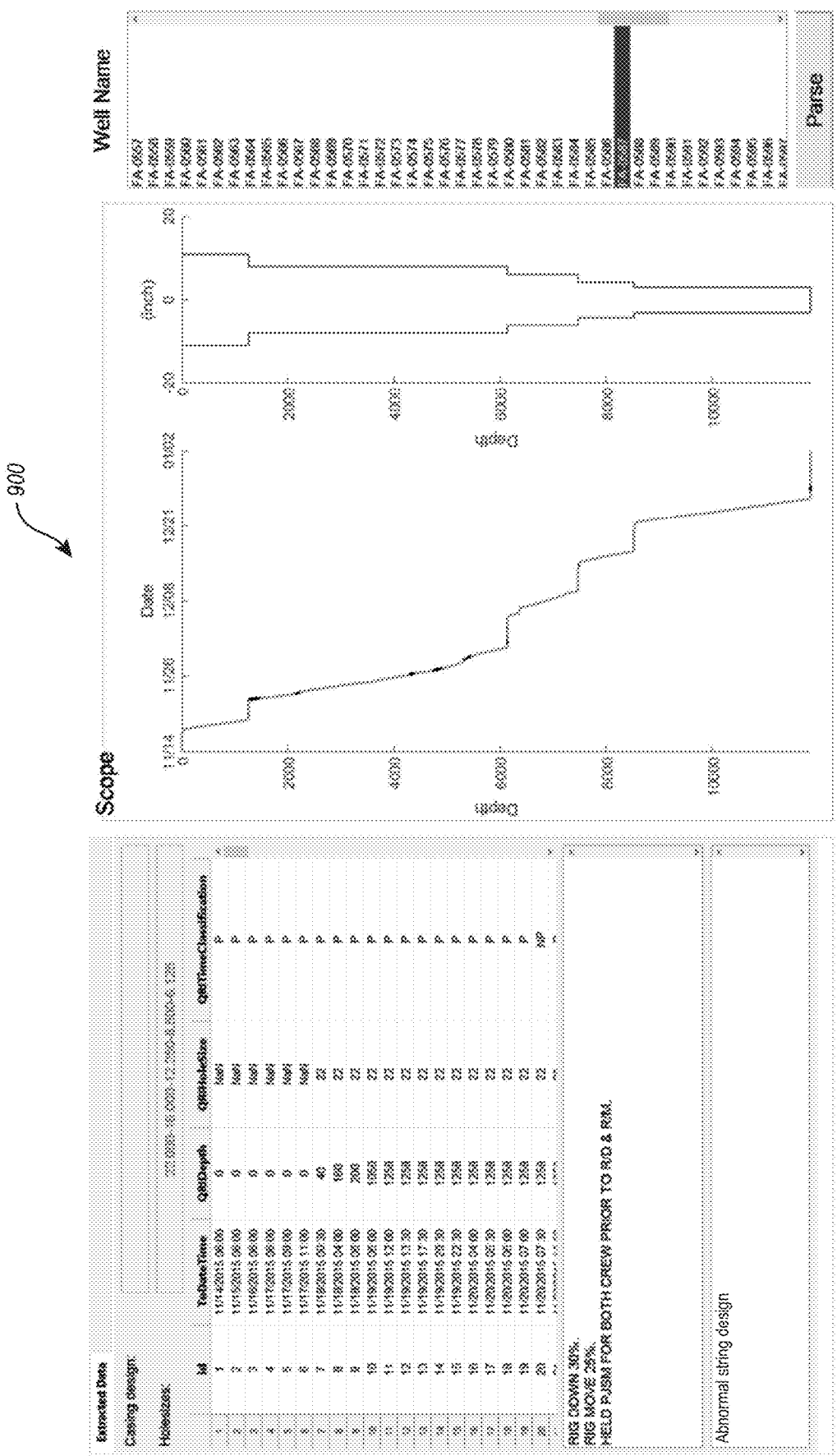
FIG. 9 illustrates a snapshot of a visualization tool used to facilitate the quality check process.

FIG. 7 shows an example of wellbore diagram 700 in image format, and FIG. 8 shows the parsed results 800. Casing sizes (13.375"-9.625"-7") and casing depths (931'-6,001'-8180') are extracted with the developed algorithm.

Text mining algorithms are developed to extract numbers from the activity descriptions in the daily drilling reports. The algorithm identifies words and numbers based on drilling keywords, despite language differences like grammar and issues like typos or incorrectly spaced sentences. The text mining algorithms take the well name and related unstructured text as input. The well name is used to distinguish text pertaining to different wells, since the input often contains data for hundreds of wells combined together, all sorted by well name. Based on the drilling keywords and units, different types of numbers with their units can be identified using regular expressions. For each line of text, the corresponding parsed data includes number, identified verbs, and identified non-verbs.

In one embodiment, the input of the text mining algorithm may be as follows in Table 2:

TABLE 2

| Original Text Description | Translation of Parsed Data |
|---|---|
| RSS DRLD *12 1/4"* *HOLE W/* SCHL. Drill | |
| XCEED *BHA F/ 7270' TO 7460'* | *[12.25  InchOrCentimeter]* |
| *9 5/8"* *CSG* POINT. | *Hole With* {13chars} *Bit From* |
| NOTE: I- SWEPT *HOLE W/ 20 BBLS* | *[7270 MeterOrFeet] To* |
| HWVP EVERY HALF STD DRLD. | *[7460         MeterOrFeet]* |

TABLE 2-continued

| Original Text Description | Translation of Parsed Data |
| --- | --- |
| | [9.625 *InchOrCentimeter*] Casing {15chars} *Hyphen* {8chars} *Hole* *With* [20 *Volume*] {22chars} Drill |

This "Original text description" shows a typical line of drilling activity description, where the drilling keywords may be highlighted with different colors for clarity. For example, in Table 2, bold represents green, bold italics represents red, and italics represents blue. In this embodiment, the text mining algorithm converts the unstructured text into a series of captured keywords and numbers that the computer can understand. This data may then be used to determine depth, hole size, and other well characteristics and parameters. It will be understood that this is merely one example of many different forms of input text and translated output text.

For the purposes of extracting the depth and hole size, capturing the information connected with numbers may be highly beneficial. Table 3 shows an example of data associated with a specific number within a line of text. The number is "7460", and number's location in the string is marked using the start index and end index properties. At this point, it is possible for the intelligent computer algorithm to interpret what this number means. By putting together all the information, the sentence reads as "Drill to 7460 ft."

TABLE 3

| Quantity | Value |
| --- | --- |
| Value | 7460 |
| Start Index | 54 |
| End Index | 58 |
| Unit | Meter/Ft |
| Type of number | Integer |
| Verb preceding number | Drill |
| Non-verb preceding number | To |
| Distance to preceding non-verb | 2 |
| Non-verb after number | Casing |
| Distance to non-verb after | 9 |

Invalid numbers for depths are removed from the extracted numbers. The type of the number can be either an integer or a range. In case of having a decimal number, another condition may be present, which indicates that the number must have depth units (i.e., meter of feet). This helps in differentiating between the possible candidates for depth and other numbers such as hole size.

Subsequently, the numbers with units of meter/ft, and after keywords 'to' and 'drill' are considered as very possible candidates for depth. The deepest drilling depths are extracted from these candidates for each row of activity description. A longest increasing sequence in deepest drilling depths may be detected. The rest of the numbers that are not included in the longest increasing sequence go through a sidetrack detection algorithm to identify possible sidetracks. Lastly, less probable drilling depths may be used to fill in the rows that do not have depth value.

The extracted numbers are filtered by possible bit sizes for the given casing design for all API bit sizes if casing design for the well is not available. Any numbers in a sentence with no mention of bit-related keywords are ignored. Hole size candidates are selected by flagging numbers that are close to bit-related keywords. Numbers with units of inches are also flagged as potential candidates for hole size. Amplifier bit pairs (e.g. 6.75"×7.5" bi-center bit) are identified by analyzing the frequency of hole size candidates that come in pairs. When a pair has been selected, the algorithm will choose the larger bit size as the hole size, since actual hole size will be determined by the larger bit size. Primary candidates for hole size are selected by using a future and past search algorithm on the list of potential hole size candidates. Primary candidates related to the hole sizes of the rat-hole and mouse-hole are removed. These drilling activities are necessary for regular drilling rig operations, but they are not related to the progress of the actual well being drilled. Algorithms are applied to guarantee that the hole size decreases monotonically (like a telescope).

Any punctuations, accent, numbers or other symbols may be removed from the activity descriptions of daily drilling reports. Subsequently, stemmers may be used to remove morphological affixes from words. The cleaned activity descriptions may be used as input to train a machine learning model. Different word embeddings such as tf-idf (term-frequency-inverse document frequency) and Word2Vec may be used to vectorize each activity description. Machine learning models such as Support Vector Machine and Logistic Regression may be used to train a model with, perhaps, 20% (or other appropriate number) of samples in the dataset prelabeled by drilling experts. The time classification (P or NP) of the rest of the samples (i.e. the other 80%) can be automatically identified by the trained machine learning model. This similar concept can also be extended for NPT type and drilling phase classifications.

This algorithm has been successfully applied to more than 2,000 wells with daily drilling reports in three countries for both Spanish and English languages. To verify the algorithms works properly, a QC tool has also been developed that shows the extracted hole sizes, depth and well design with associated text. If the information/text mining algorithm fails to meet the heuristic drilling rules, a warning message will be shown. Thus, instead of performing QC for all the wells, it is possible to only focus on the wells where the algorithm failed to successfully extract the required information. This tool accelerates the QC task significantly, from several months to only a few days time. A snapshot 900 of such a tool is provided in FIG. 9 to facilitate the QC process. Extracted information obtained from the algorithm is visualized for a list of wells within a given region or at a given hydrocarbon extraction site.

By using the proposed methodology, amount of non-productive time and associated causes can be accurately estimated for hundreds of wells in a field only by quality checking a portion of the data by drilling experts and training the model. Since at this stage all the data is aggregated at this stage (geology, well type, survey, production, rock properties, etc.), detailed NPT analysis (such as NPT in each hole size, drilling phase, year, company, team, etc.) can be conducted. This provides a valuable insight to finding the drilling and completions inefficiencies and bottlenecks at each stage.

Applying machine learning and natural language processing thus enables the systems and methods described herein to analyze and quality check hundreds to thousands of wells in a very short time and hence speed up the overall process significantly. In addition, after building the corpus and training the machine learning models by using only portion of the data, it can be applied to future wells drilled in the field with minimal modifications. After applying the machine learning and natural language processing, drilling and completion analytics can be generated and visualized to identify any bottlenecks at a well that are present and propose solutions to improve performance.

The analytics allow wells to be ranked based on various parameters including initial production, days to drill, normalized days to drill (e.g. days per 10 k ft.), cost/ft., cost/bbl., Drilling Efficiency Index (DEI), Completion Efficiency Index (CEI), NPT, etc. This makes it very difficult, in traditional systems, to compare global efficiency of the wells takes the reservoir management parameters into account as well as D&C parameters. The embodiments herein provide a unifying system to assign each well a global drilling and completion score (e.g. 0-100) that can simplify the comparison of overall well performance and single out the problematic areas which can accelerate the diagnoses process. Note that, at least in some embodiments, to make the comparison fair and meaningful, the global scores are based on well type (i.e., horizontal, vertical, deviated, highly deviated etc.) and targeted production zones. For instance, among all the horizontal wells drilled in field/region "X" which targeted production zone "Y", the well with the best performance in the studied area would receive a 100 and the well with the worst performance would receive a 0. Global Drilling Score (GDS) considers the following parameters:
1. NPT associated with drilling
2. Average rate of penetration
3. Drilling efficiency index which is defined as:

$$DEI = \frac{\text{Average hydrocarbon rate during a certain period}}{\text{Days to drill the well (spud to rig release)}}$$

For example, if the average oil rate over a 12-month period is 500 barrels per day (B/D) and it takes 50 days to drill the well (from spud to rig release), the DEI is 500/50=10 B/D/rig day).

4. Drilling cost per volume of produced hydrocarbon produced over a certain period may also be determined. For instance, if it costs 1 million USD to drill a well that produces 100,000 barrels of oil over 12 months, the drilling cost/barrel is 1,000,000/100,000=10 USD/barrel. Still further, 5. drilling cost per final measured depth of the well may be calculated. For instance, if it costs 1 million USD to drill a 10,000 ft well, the cost/ft is 1,000,000/10,000=1,000 USD/ft.

Therefore, it is possible to focus the areas that had poor performance and conduct deeper investigation to find the root cases. A global drilling score might show that DEI for the subject well is too low in comparison with other vertical wells in the region while other metrics are in an acceptable range. Therefore, even though this well has acceptable drilling performance, a low production rate resulted in a low DEI. This can be due to serval reasons such as poor targeting of the productive formation or not following the best completion practices, etc. Visual color codes may be used in a graphical user interface to indicate good (e.g. green) and poor (e.g. red) performance.

A Global Completion Score (GCS) considers the following parameters:
1. NPT associated with completion (from the completion daily reports) and
2. completion efficiency index which is defined as:

$$CEI = \frac{\text{Average hydrocarbon rate during a certain period}}{\text{Days to complete the well}}$$

For example, if the average oil rate over a 12-month period is 500 B/D and it takes 10 days to drill the well (from spud to rig release), the DEI is 500/10=50 B/D/completion day).

3. The completion tying efficiency (CTE) is defined as:

$$CTE = \frac{\text{Average hydrocarbon rate during a certain period}}{\text{Days from completion } unilt \text{ the well put on production}}$$

For example, if the average oil rate over a 12-month period is 500 B/D and it takes 20 days from the termination of production until the well is put on production, the CTE is 500/20=25 B/D/tying day).

4. Completion cost per volume of produced hydrocarbon produced over a certain period may also be calculated. For instance, if it costs 0.5 million USD to complete a well that produced 100,000 barrels of oil over 12-month, the completion cost/barrel is 500,000/100,000=5 USD/barrel.

5. Another measure is drilling cost per final measured depth of the well. For instance, if it costs 0.5 million USD to complete a 10,000 ft well, the cost/ft is 500,000/10,000=500 USD/ft.

A score is obtained for each Key Performance Indicator (KPI): First, outliers are removed. For example, let $v_i$ be the KPI value for well i, $\mu$ and $\sigma$ be the mean and standard deviation value of KPI for all wells. $|v_i-\mu|>n\sigma$ is considered abnormal values. Let $v_{best}$ and $v_{worst}$ be the best and worst normal KPI values, respectively. The KPI score for well i is obtained as $$s_i = 100\frac{v_i - v_{worst}}{v_{best} - v_{worst}}$$

for normal $v_i$. The score is either 100 or 0 for the best and worst values of $v_i$. The Global drilling score may be obtained as the weighted average of each KPI score. The weight for each KPI may vary for each application.

Some embodiments herein use historical data to optimize future plans, to optimize resource allocation, rig scheduling, capital efficiency, etc. by comparing the historical data to the original plan (i.e. to the forecasted data of the original plan). The problem of scheduling the rigs consists of finding the best schedule for the available rig fleets to maximize/minimize the objective functions (such as production, net present value, operation duration, etc.). The scheduling algorithm may be designed to handle several constraints. For instance, some rigs can only remain in a certain geographical area or only can be used for certain tasks such a workover.

The scheduling embodiments herein apply a data-driven approach to consider historical rig performance over time and production forecasts (which is one of the major unknowns of the optimization problem) for future planning and optimization. The integrated approach described herein uses the historical data for future planning and resource allocation which can greatly improve the accuracy of the proposed plan. In addition, the proposed method can compare the optimized plan with original one and present the added value for each objective function (e.g., in terms of NPV comparison or cumulative production comparison). Moreover, it is also possible to experiment with different "what if" scenarios in a very short time which can greatly assist with the decision-making process. For example, what will be the additional production and NPV if drilling performance is improved by 10% next year (by considering several constraints such as similar D&C budget, maximum number of wells, current rig fleet, etc.).

Figure 10:
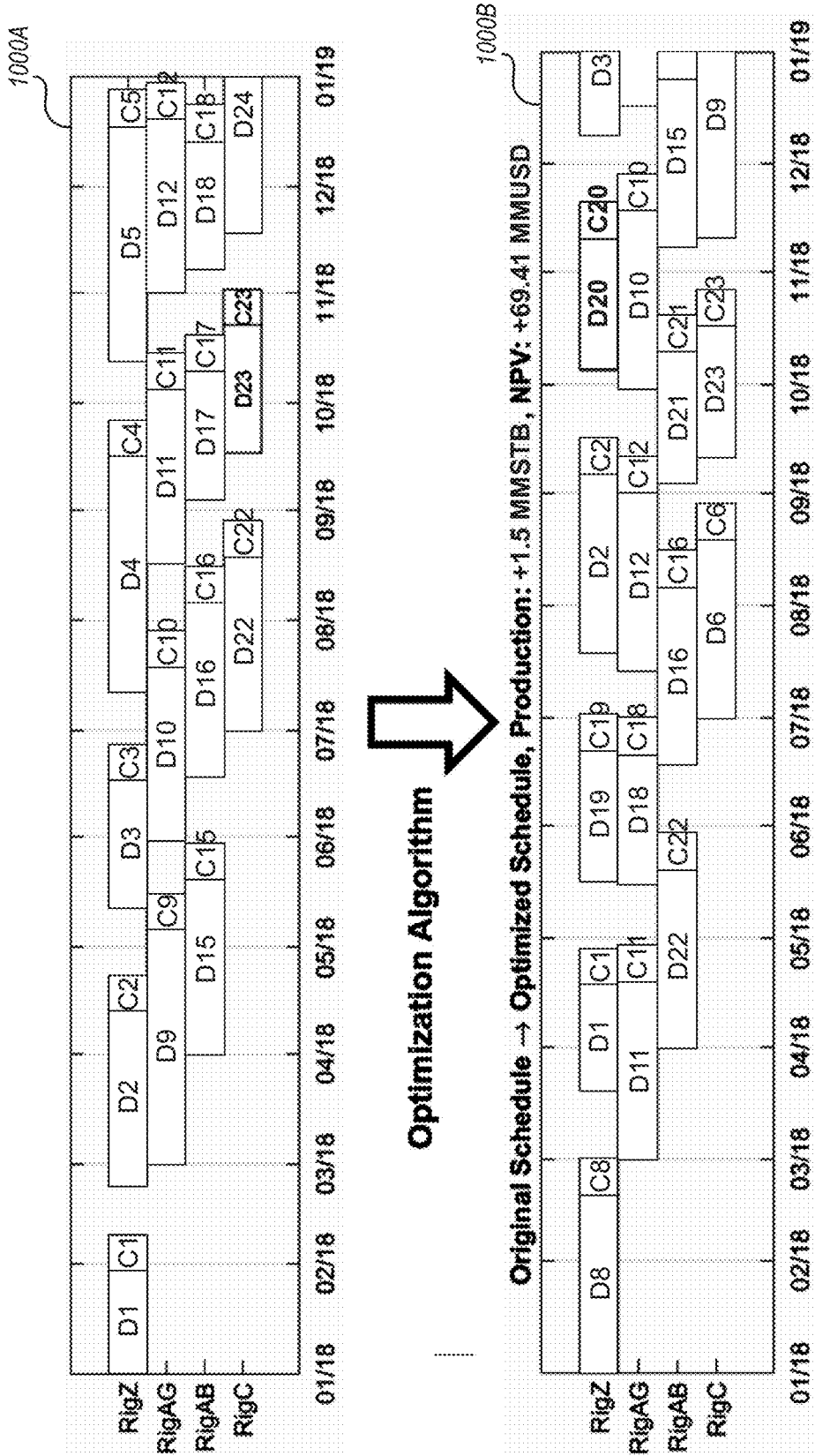
FIG. 10 illustrates embodiments of original and optimized rig scheduling plans.

In one embodiment, as illustrated in FIG. 10, the applied methodology has been described to optimize resource allocation and rig scheduling. Assume the previous steps have been taken and now the goal is to optimize the future plan. In this example, there are 25 wells in the inventory. The plan is to drill these wells with four rigs from January 2018 to January 2019. Each rig has its own availability date, and the rig move duration is estimated based on the location of the wells (it can also be determined by the user). The production forecast for these wells are defined by the user. The original schedule for the rigs 1000A is shown in FIG. 10 (top). For example, according to the original plan, Rig Z, for instance, should drill and complete wells D1, D2, D3, D4 and D5. Since the historical information about the rig performance is available, it has been taken into account and optimizers have been used to maximize NPV (the objective function) for this scenario. By using this plan, 16 out of 25 wells can be drilled in the one-year period. FIG. 10 (bottom) shows the optimized schedule 1000B in which Rig Z now should drill wells D8, D1, D19, D2, D20, and D3 instead. This order meets the optimization requirement for this example in which the best wells should be drilled first with the best rigs. By using the optimized plan, 18 out of 25 wells can be drilled within the timeframe.

Figure 11:
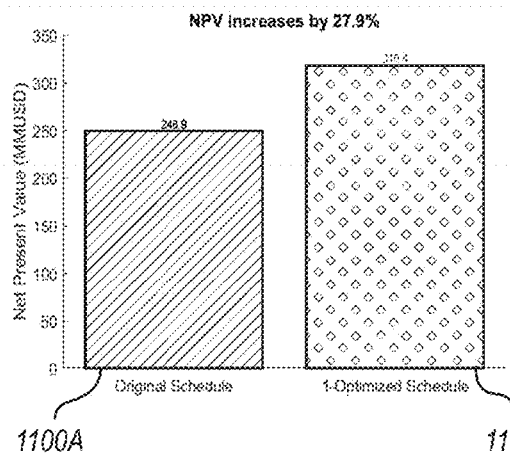
FIG. 11 illustrates a comparison of the net present value (NPV) for an original plan with an optimized plan for the evaluation period.
Figure 12:
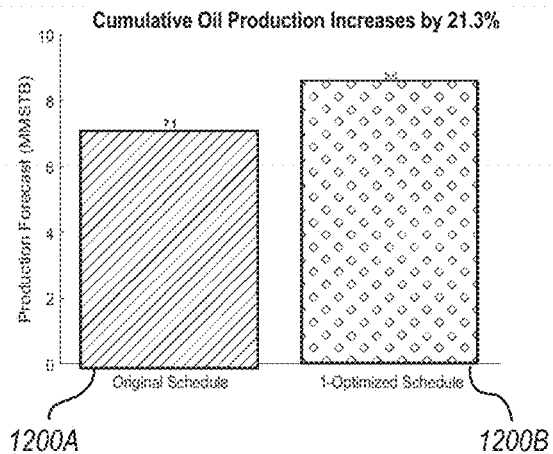
FIG. 12 illustrates a comparison of cumulative production for an original plan with an optimized plan for the evaluation period.
Figure 13:
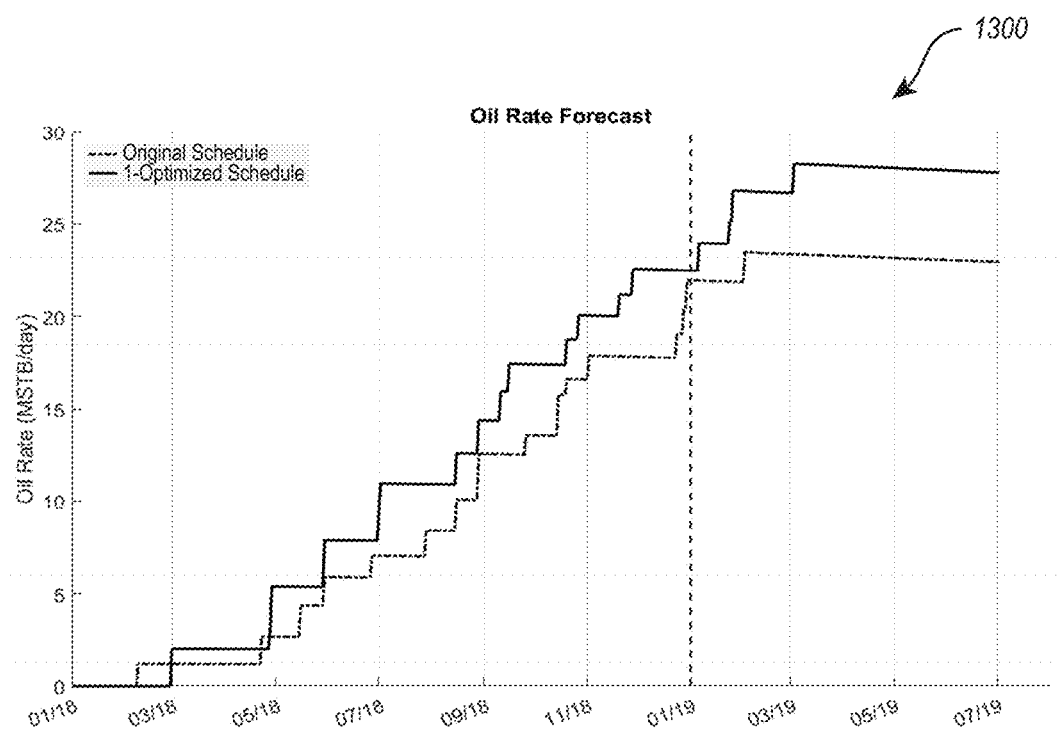
FIG. 13 illustrates a chart showing an original production profile and an optimized production profile due to resource allocation optimization.

FIGS. 11 and 12 graphically compare the NPV and cumulative production of the original plan (1100A/1200A) with the optimized plan (1100B/1200B) over the evaluation period which, in this example, is 18 months. These figures indicate that by optimizing the original plan (and assuming that the drilling performance does not change over the 1-year planning period), NPV and cumulative production can be increased by 28% and 23%, respectively. Chart 1300 of FIG. 13 shows the original (dotted line) and optimized (solid line) production profile. This figure indicates that by using the production forecast in calculations, it is possible to accelerate production by drilling the best wells first. The area under each curve presents the cumulative production, and the gap between the original and optimized curves shows the additional cumulative production that can potentially be obtained by optimizing the plan. These concepts will be explained further below with regard to methods 1400 and 1500 of FIGS. 14 and 15, respectively.

Figure 14:
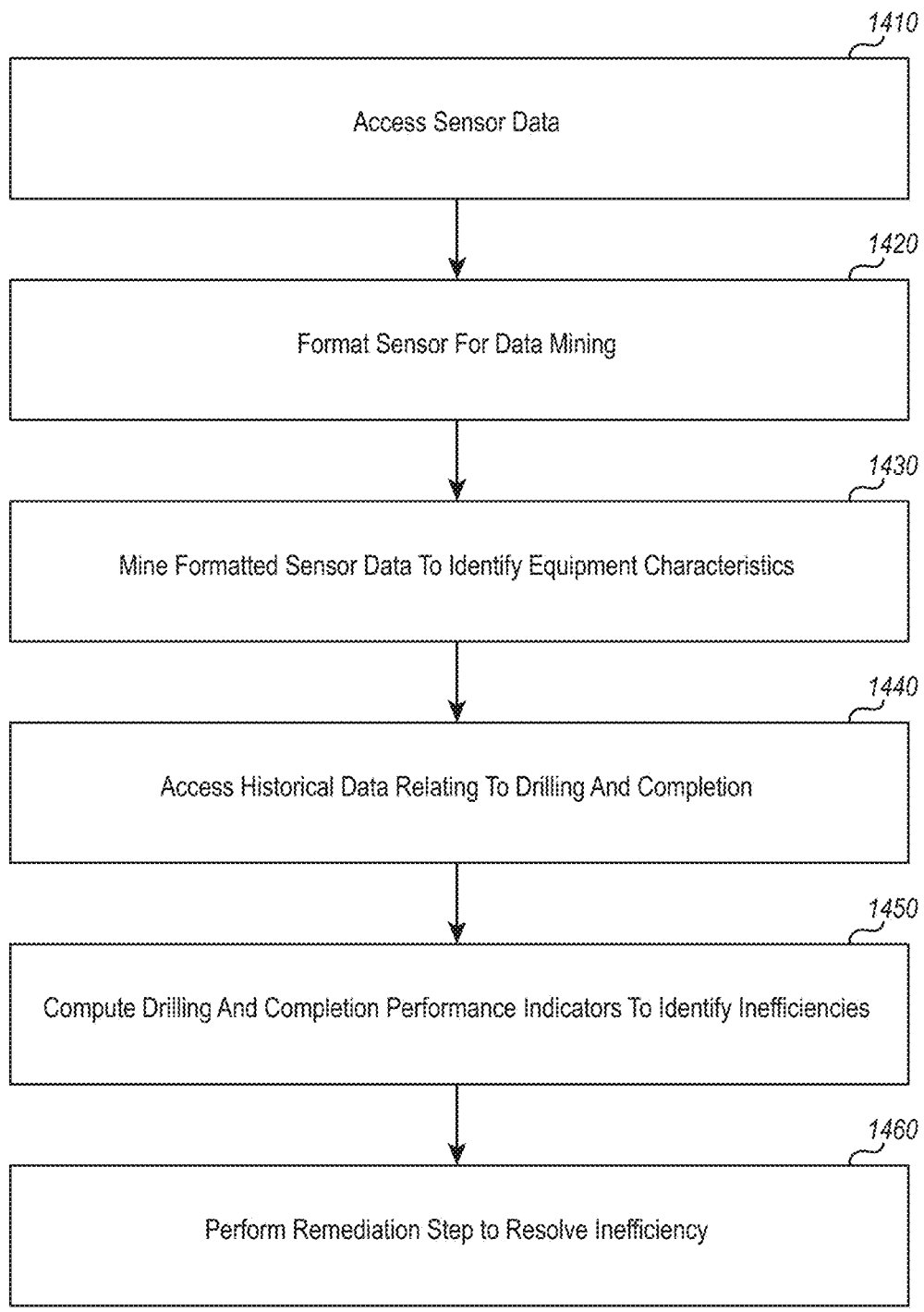
FIG. 14 illustrates a flowchart of an example method for managing a drilling and completions process at a hydrocarbon extraction site.
Figure 15:
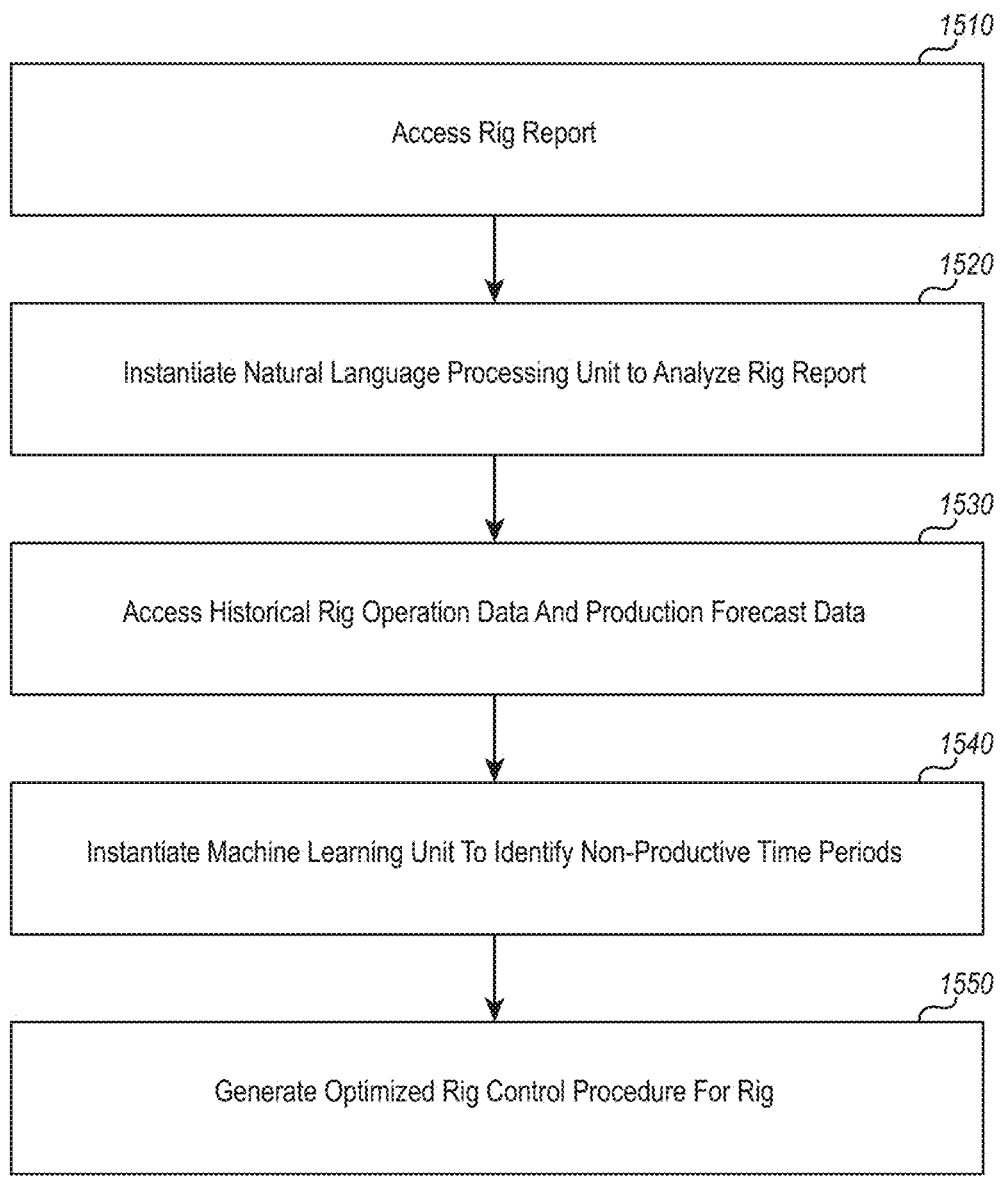
FIG. 15 illustrates a flowchart of an example method for optimizing resource allocation at a hydrocarbon extraction site.

In view of the systems and architectures described above, methodologies that may be implemented in accordance with the disclosed subject matter will be better appreciated with reference to the flow charts of FIGS. 14 and 15. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 14 is a flowchart that illustrates a method 1400 for managing a drilling and completions process at a hydrocarbon extraction site. The method 1400 will now be described with frequent reference to the components and data of environment 100 of FIG. 1.

Method 1400 includes accessing data generated by one or more hardware sensors implemented by one or more pieces of drilling and completion equipment at the hydrocarbon extraction site (1410). For example, the data formatter 107 may access sensor data 124 generated by hardware sensors 120. These hardware sensors may be attached to or part of various pieces of drilling and completion equipment 119, or may be used in other locations on a hydrocarbon extraction site 118. For instance, sensors may be placed in the ground, in the drill, in the extraction rig 121 or in other locations. Each sensor may provide data via a wired or wireless connection to computer system 101. This sensor data 124 may be received by the communication module 104, or by the data formatter 107.

The hydrocarbon extraction site 118 can include one or multiple drilling rigs, completion rigs, or other types of rigs. Each rig is designed to perform tasks including drilling tasks, completion tasks, workover tasks or other types of tasks. As these tasks are performed, the sensors 120 take readings and measurements and transfer the same to the computer system. As the data is received, the data formatter 107 of computer system 101 accesses the sensor data and formats it into a form readable by at least one data mining algorithm (1420). The data mining algorithm may be any type of algorithm configured to search documents, databases or other data structures for certain types of information (including the specific types of data mining algorithms mentioned above). Each data mining algorithm (e.g. data miner 109) may be designed to mine the data once it has been prepared or formatted in a certain manner. The data formatter 107 may format the data in a changeable manner depending on which mining algorithm will be used to mine the data.

Method 1400 next includes mining the formatted sensor data to identify one or more characteristics related to the one or more pieces of drilling and completion equipment (1430). The data miner 109 of computer system 101 may thus search the formatted sensor data 108 to identify characteristics related to the D&C equipment 119. The characteristics 110 may include any type of operating data that may indicate successful or unsuccessful operation of the extraction rig 121. The D&C characteristics 110 may also include indicators that point to problems or inefficiencies in the rig that could be improved. As will be seen further below, when these inefficiencies 115 are identified, remediation steps 117 may be taken at the rig 121 to reduce or eliminate the inefficiencies. Thus, in at least some embodiments, the methods described herein may be uses to directly control the extraction rig 121 and any associated D&C equipment 119.

Method 1400 also includes accessing one or more portions of historical data relating to the one or more pieces of drilling and completion equipment at the hydrocarbon extraction site, wherein the accessed historical data is integrated with the formatted sensor data (1440). The data integration module 111 may access historical data 126 relating to operation of the D&C equipment 119 at extraction site 118. The historical data 126 may include sensor data 124 and operational data indicating drill status, rig status, inputs and outputs, measurements and other data gathered over a previous time period and stored in the data store 125. This historical data 126 may then be combined or integrated with the formatted sensor data 108.

This integrated historical and sensor data 112 provides a large amount of current and past data related to a given rig or piece of equipment. Clues can be taken from different portions of data that may indicate why a rig was performing well over a given time period, or was performing below expectations. Rock type, rock formations, inter-well pressures, drill speed, drill angle, fluid flow rates and other inferences or determinations may be made from the data or may be stated explicitly by the data. Each type of data including historical data and current data may be used to learn where operations are producing at a high level, and where operations are producing at a sub-optimal level.

The performance computation module 113 may access the integrated historical and sensor data 112 as well as the D&C equipment characteristics 110 to computer drilling and completion performance indicators 114 (1450). These D&C performance indicators 114 are configured to identify inefficiencies 115 in the operation of the rig based on the characteristics 110 identified for the drilling and completion equipment and based on the integrated historical and sensor data 112. The inefficiencies 115 may identify any individual piece of D&C equipment 119 that is operating at a pace or level that is below what is possible. For instance, if historical data 126 indicates that a given piece of D&C equipment 119 has operated more efficiently in the past, other data surrounding production at that time may be analyzed to learn why that equipment was operating more efficiently at that time. If this "why" can be determined, then the remediation module 116 can take the steps necessary to return that equipment to its higher level of efficiency.

Indeed, method 1400 includes, upon identifying the at least one drilling and completion inefficiency 115, performing at least one remediation step 117 to resolve the at least one identified inefficiency (1460). The remediation step 117, as determined by the remediation module 116, may change operating parameters of the extraction rig 121 and/or certain pieces of D&C equipment 119. Alternatively, the remediation step 117 may be to indicate that the extraction rig should be brought down for maintenance or for replacement of a given part, or that the rig may be pushed beyond the level at which it is currently producing, knowing based on historical data, that the equipment is capable of handling more. Many different scenarios are contemplated for the remediation step and the changes it can cause to take place in the extraction rig 121.

In some embodiments, performing the remediation step 117 to resolve the identified inefficiency 115 may include manually or automatically modifying operation of different pieces of drilling and completion equipment 119 at the hydrocarbon extraction site 118 including modifying the operation of producing oil wells, water injection wells, gas injection wells, heat injectors, sub-components of any of these wells. Adjusting operation of the drilling and completion equipment may include changing oil production volume, changing drill pressure, changing well bore path or changing other production variables or operational parameters.

In some cases, the computer system 101 may be configured to automatically perform a quality control analysis on the formatted sensor data 108 to identify mistakes and inconsistencies in the sensor data 124. For example, the sensor data 124 and other operation data 123 may be received separately or in a daily drilling report 122. This data in the drilling and completion report 122 may include errors or inaccuracies. The computer system 101 may be configured to analyze the operation data 123 and/or the sensor data 124 to identify these errors. This automatic quality checking may be performed on each daily drilling report or "rig report" received at the computer system 101. As will be explained further below with regard to Method 1500 of FIG. 15, advanced text mining and natural language processing (NLP) techniques may be used to extract information from the rig report including hole size, current depth, casing size or other information. The determined hole size and casing sizes may be cross-checked with wellbore diagrams to assure validity of the results.

When the historical operation data 126 is integrated with the sensor data 124, it will be understood that various additional data sources may also be integrated with the formatted sensor data and the historical data. For example, geology data, production data, survey data, fracture and pore pressure data, and mud and bit data sets may all be integrated with the historical data and/or the daily rig report data. This enables the methods and systems herein to find the most problematic formations during drilling, optimize the required mud properties for wellbore stability and cleaning, find the best performance bit for each formation and hole size, and perform other optimizations. In some embodiments, the daily production data (i.e. 123) may be correlated with drilling and completion performance data by using a drilling efficiency index (DEI) and completion efficiency index (CEI). This efficiency index indicates, on a relative scale, how efficient the overall process was.

Data mining, machine learning and resource allocation optimization may all be used in combination to conduct automated quality checking for big D&C data, for information mining, for aggregating data sets from different sources, for predicting the productive and non-productive time and its type, for predicting the drilling phase, for identifying drilling bottlenecks, and for using historical data for future planning and resource allocation.

In some embodiments, once the drilling and completion performance indicators 114 have been generated, they may be submitted, along with an indication of the remediation steps 117 determined to resolve the drilling and completion inefficiency, to a drilling and completions subject matter expert. This expert can then perform a manual review of the indicators and the remediation step to verify that the data appears to be accurate, and that the remediation step appears to be appropriate.

Before sending the data to the expert, natural language processing algorithms may be used to extract relevant sensor data, and machine learning algorithms may be implemented to determine what the extracted sensor data means. The machine learning algorithms determine which time during a given time period was non-productive and which type of non-productive time it was. Moreover, the algorithms may indicate the drilling parameters which can assist with finding out why the downtime occurred (e.g. was it due to a certain type of geology, due to certain people working on it, etc.). The identified type of non-productive time may include rig repair time, mud loss, time spent on a stuck pipe, etc. The algorithms may further identify operation phase (e.g., drilling, casing and cement, coring, logging, etc). In some cases, training data may be used (i.e. a select portion of pre-labeled data provided by experts) that is used for training the machine learning algorithm and making predictions for the remaining data set. This provides a substantial speed increase to the entire process.

The natural language processing algorithms may be configured to extract relevant sensor data by analyzing the sensor data 124 to identify keywords. Then, regular expressions may be implemented to identify relevant numerical candidates. After this, heuristics may be implemented to filter out non-viable results. The machine learning algorithms may also be configured to perform feature extraction for the sensor data using vectorization. As noted above, vectorization assigns a vector representation to each word and weights each word according to one or more statistical algorithms. This results in a weighted average for each paragraph of analyzed text (including, but not limited to, term frequency inverse document frequency, term-frequency-inverse document frequency, etc.) The vectorized text may be used to extract features for machine learning and classification. These indicators may be implemented to compute a score for the drilling and completions equipment when compared to drilling and completions equipment in a same or similar area (i.e. in the same field, region, or country).

The computer system 101 may also be configured to generate an interactive user interface to display this score, along with other information. This user interface may be configured, for example, to present an indication of downtime for the drilling and completion equipment. It may also present an indication of a cause for the downtime. The user interface may also show an indication of which design or tool is causing a specific inefficiency, along with an indication of how much a given solution will improve the inefficiency. For example, the user interface may show that if remediation step 117 is taken, or if a specific valve is selected, hydrocarbon production will improve by X percent. The user interface can show recommended drill designs, recommended bit, and can show an estimated time to drill. Thus, the user interface can show how to drill a given site, and can show which equipment to use for optimal performance at that specific site.

Thus, an interactive visualization tool may be used to present drilling and completion performance indicators, among other data. This allows users to identify drilling and completion inefficiencies or obstacles using the visualization tool. Each rig or well on a given site may be assigned a comprehensive performance score from (e.g. 0-100) according to placement, drilling, completion, production, capital efficiency or other factors. By applying this method, it is possible to single out the wells that had poor performance in a particular practice (e.g., drilling) for more detailed analysis. In addition to the score and other information, the user interface may indicate the time needed to drill, time needed to finish completion, and may also show which valves are good or bad. In this manner, the user interface may present or provide access to a wide variety of information relevant to the operation of a rig.

Turning now to FIG. 15, a method 1500 is illustrated for optimizing resource allocation at a hydrocarbon extraction site. The method 1500 will now be described with frequent reference to the components and data of environment 100.

Method 1500 includes accessing a rig report that includes current rig operation data for at least one hydrocarbon extraction task that implements a hydrocarbon extraction rig at the drilling and completions site (1510). For example, the communications module 104 of computer system 101 may receive or access a daily drilling report 122 having operation data 123. This rig report 122 may be accessed from a data store 125 or from a report generator. The rig report may be sent to a natural language processing unit 128 for processing.

Indeed, method 1500 includes instantiating a natural language processing unit configured to analyze the accessed drilling report for specific portions of rig operation data (1520). The computer system 101 may instantiate natural language processing unit 128 which analyzes the rig report 122 for specific types of operation data 123. The specific types of operation data may include well depth, drill speed, wellbore size, casing size, and other types of data.

Method 1500 next includes accessing one or more portions of historical rig operation data and production forecast data related to the at least one rig (1530). The historical rig and operation data 126 may be stored in data store 125, along with the production forecast data 127. The computer system 101 may access this data and provide it to the machine learning unit 129. The production forecast data 127 may include computer-generated or user-generated forecasts for future production data at the extraction site 118. The computer system may instantiate the machine learning unit 129 to analyze the current and historical rig operation data 126 to identify drilling and completion phase 135 non-productive time periods 130 during which the hydrocarbon extraction task is halted or is producing below a specified minimum productivity level (1540). Then, using this data, the machine learning unit 129 can generate an optimized rig scheduling sequence 132 for the rig 121 that optimizes an objective function by allocating resources to the hydrocarbon extraction task during times when productivity is projected to be above the specified minimum production level (1550).

For example, the machine learning unit 129 may look at the daily report 122 and forecast data 127 to identify times in the past when the rig was productive and times when the rig was non-productive (130) or less productive. The machine learning unit 129 can use this data to generate a scheduling sequence 132 which assigns the rigs in a manner that is most productive or efficient. This is accomplished by optimizing an objective function (e.g. Net-Present Value or cumulative production). Once the objective function has been optimized, resources are allocated to a given hydrocarbon extraction task according to the optimization. In this manner, resources are allocated to the hydrocarbon extraction task during times when productivity is projected to be above the specified minimum production level. In some cases, the objective function may be to maximize Net-Present Value, or may be to maximize production, or may be to minimize the operation time. In any case, inefficiencies 115 will be reduced and production will be increased. Once the rig scheduling sequence 132 has been generated, the extraction rig 121 may be operated according to the optimized rig scheduling sequence.

The machine learning unit 129 may be configured to perform an analysis of any non-productive time periods 130 identified in the historical data 126 or in the drilling report 122. Non-productive times indicate hydrocarbon production bottlenecks or other inefficiencies. Non-productive time may be analyzed for each field, each well, each formation, hole size, company, team, well design, well type, drilling phase, etc. Each root cause 131 of non-productive time may thus be systematically identified and resolved using the rig scheduling sequence 132. This information may also be used for resource allocation optimization and for scheduling of future well operations.

Accordingly, methods, systems and computer program products are provided which manage a drilling and completions process at a hydrocarbon extraction site. Moreover, methods, systems and computer program products are provided which optimize resource allocation at a hydrocarbon extraction site. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for improving a drilling and completions process at a hydrocarbon extraction site, the method comprising:

accessing sensor data generated by one or more hardware sensors implemented by one or more pieces of drilling and completion equipment of a hydrocarbon extraction rig located at the hydrocarbon extraction site, wherein the hydrocarbon extraction rig is designed to perform a hydrocarbon extraction task, and wherein the sensor data details performance of the hydrocarbon extraction task by the hydrocarbon extraction rig;

formatting the accessed sensor data into a form readable by at least one data mining algorithm;

mining the formatted sensor data to identify one or more characteristics related to the one or more pieces of drilling and completion equipment;

integrating historical data relating to the one or more pieces of drilling and completion equipment at the hydrocarbon extraction site with the formatted sensor data;

accessing one or more portions of the historical data relating to the one or more pieces of drilling and completion equipment at the hydrocarbon extraction site that is integrated with the formatted sensor data;

computing one or more drilling and completion performance indicators configured to identify inefficiencies based on the characteristics identified for the drilling and completion equipment and based on the integrated historical and sensor data;

upon identifying the at least one drilling and completion inefficiency, performing at least one remediation step to resolve the at least one identified inefficiency;

causing a machine learning unit to generate an optimized rig scheduling sequence for the hydrocarbon extraction rig, where the optimized rig scheduling sequence optimizes an objective function by allocating resources to the hydrocarbon extraction task during times when productivity of the hydrocarbon extraction rig is projected to be above a specified minimum production level, wherein the optimized rig scheduling sequence is based on the at least one remediation step, and wherein the objective function includes one or more of: a cumulative production of the hydrocarbon extraction rig, a net present value (NPV) of the hydrocarbon extraction rig, or an operation duration of the hydrocarbon extraction rig; and causing the hydrocarbon extraction rig to operate in accordance with the optimized rig scheduling sequence that was generated by the machine learning unit.

2. The method of claim 1, wherein performing the at least one remediation step to resolve the at least one identified inefficiency includes manually or automatically modifying operation of the one or more pieces of drilling and completion equipment at the hydrocarbon extraction site selected from producing oil wells, water injection wells, gas injection wells, heat injectors, or sub-components thereof.

3. The method of claim 1, further comprising automatically performing a quality control analysis on the formatted sensor data to identify mistakes and inconsistencies in the sensor data, wherein at least one form of sensor data comprises periodic drilling and completion reports.

4. The method of claim 1, further comprising integrating one or more additional data sources with the formatted sensor data and the historical data.

5. The method of claim 1, further comprising instantiating an interactive visualization tool configured to present the drilling and completion performance indicators, allowing users to identify drilling and completion inefficiencies or obstacles using the visualization tool.

6. The method of claim 1, further comprising submitting the drilling and completion performance indicators, along with an indication of the remediation step determined to resolve the drilling and completion inefficiency to a drilling and completions subject matter expert.

7. The method of claim 1, wherein mining the formatted sensor data includes:

implementing natural language processing algorithms to extract relevant sensor data; and implementing machine learning algorithms to determine what the extracted sensor data means.

8. The method of claim 7, wherein the natural language processing algorithms extract relevant sensor data by analyzing the sensor data to identify one or more keywords, implementing regular expressions to identify relevant numerical candidates, and implementing heuristics to filter non-viable results.

9. The method of claim 7, wherein the machine learning algorithms determine whether a given time period was productive or non-productive and, for non-productive time periods, which type of non-productive time occurred.

10. The method of claim 9, wherein the machine learning algorithms further determine which drilling phase the drilling and completion equipment was in during periods of productive time or during periods of non-productive time.

11. The method of claim 9, wherein the machine learning algorithms perform feature extraction for the sensor data using vectorization, wherein vectorization assigns a vector representation to each word and weights each word according to one or more statistical algorithms, resulting in a weighted average for each paragraph of analyzed text.

12. A method, implemented at a computer system that includes at least one processor, for optimizing resource allocation at a hydrocarbon extraction site, the method comprising:

accessing a drilling and completion report that includes current operational description data for at least one hydrocarbon extraction task that implements a hydrocarbon extraction rig at the drilling and completions site;

instantiating a natural language processing unit configured to analyze and mine the accessed drilling and completion report for specific portions of operational description data;

accessing one or more portions of historical operational data and production forecast data related to the at least one rig;

instantiating a machine learning unit configured to analyze the current and historical rig operation data to identify drilling and completion phase and non-productive time periods during which the hydrocarbon extraction task is halted or is producing below a specified minimum productivity level; and generating an optimized rig scheduling sequence for the at least one rig that optimizes an objective function by allocating resources to the hydrocarbon extraction task during times when productivity is projected to be above the specified minimum production level, wherein the at least one rig is operated according to the optimized rig scheduling sequence.

13. The method of claim 12, further comprising performing an analysis of the non-productive time periods to identify where hydrocarbon production bottlenecks exist.

14. The method of claim 13, further comprising identifying one or more procedures that are determined to reduce the non-productive time periods.

15. The method of claim 12, wherein the optimized rig scheduling sequence is configured to optimize one or more objective functions over a specified evaluation period.

16. A system for managing a drilling and completions process at a hydrocarbon extraction site, said system comprising:
- at least one piece of drilling and completions equipment;
- one or more hardware sensors operatively connected to the piece of drilling and completions equipment;
- one or more processors; and
- one or more computer-readable media that store computer-executable instructions which, when executed, perform the following:
  - access sensor data generated by one or more hardware sensors implemented by one or more pieces of drilling and completion equipment of a hydrocarbon extraction rig located at the hydrocarbon extraction site, wherein the hydrocarbon extraction rig is designed to perform a hydrocarbon extraction task, and wherein the sensor data details performance of the hydrocarbon extraction task by the hydrocarbon extraction rig;
  - format the accessed sensor data into a form readable by at least one data mining algorithm;
  - mine the formatted sensor data to identify one or more characteristics related to the one or more pieces of drilling and completion equipment;
  - integrate historical data relating to the one or more pieces of drilling and completion equipment at the hydrocarbon extraction site with the formatted sensor data;
  - access one or more portions of historical data related to the hydrocarbon extraction site relating to the one or more pieces of drilling and completion equipment that is integrated with the formatted sensor data;
  - compute one or more drilling and completion performance indicators configured to identify inefficiencies based on the characteristics identified for the drilling and completion equipment and the integrated historical and sensor data;
  - upon identifying the at least one drilling and completion inefficiency, perform at least one remediation step to resolve the at least one identified inefficiency;
  - cause a machine learning unit to generate an optimized rig scheduling sequence for the hydrocarbon extraction rig, where the optimized rig scheduling sequence optimizes an objective function by allocating resources to the hydrocarbon extraction task during times when productivity of the hydrocarbon extraction rig is projected to be above a specified minimum production level,
    - wherein the optimized rig scheduling sequence is based on the at least one remediation step, and
    - wherein the objective function includes one or more of: a cumulative production of the hydrocarbon extraction rig, a net present value (NPV) of the hydrocarbon extraction rig, or an operation duration of the hydrocarbon extraction rig; and
  - cause the hydrocarbon extraction rig to operate in accordance with the optimized rig scheduling sequence that was generated by the machine learning unit.

17. The system of claim 16, wherein the drilling and completion performance indicators are implemented to compute a score for the drilling and completions equipment compared to drilling and completions equipment in a same or similar area.

18. The system of claim 16, further comprising generating a user interface configured to present an indication of downtime for the drilling and completion equipment and an indication of a cause for the downtime.

19. The system of claim 18, wherein the generated user interface is configured to present an indication of which design or tool is causing a specific inefficiency, and an indication of how much a given solution will improve the inefficiency.

20. A system for optimizing resource allocation at a hydrocarbon extraction site, comprising:
- at least one piece of drilling and completions equipment;
- one or more hardware sensors operatively connected to the piece of drilling and completions equipment;
- one or more processors; and
- one or more computer-readable media that store computer-executable instructions which, when executed, perform the following:
  - access a drilling and completion report that includes current operational description data for at least one hydrocarbon extraction task that implements a hydrocarbon extraction rig at the drilling and completions site;
  - instantiate a natural language processing unit configured to analyze and mine the accessed drilling and completion report for specific portions of operational description data;
  - access one or more portions of historical operational data and production forecast data related to the at least one rig;
  - instantiate a machine learning unit configured to analyze the current and historical rig operation data to identify drilling and completion phase and non-productive time periods during which the hydrocarbon extraction task is halted or is producing below a specified minimum productivity level; and
  - generate an optimized rig scheduling sequence for the at least one rig that optimizes an objective function by allocating resources to the hydrocarbon extraction task during times when productivity is projected to be above the specified minimum production level, wherein the at least one rig is operated according to the optimized rig scheduling sequence.

* * * * *